United States Patent [19]
Magyar

[11] Patent Number: 5,851,961
[45] Date of Patent: Dec. 22, 1998

[54] ANTI-SETTLING LUBRICITY AGENT FOR WATER/OIL DISPERSION COMPOSITIONS

[75] Inventor: James S. Magyar, Bedford, Ohio

[73] Assignee: The Lubrizol Corporation, Wickliffe, Ohio

[21] Appl. No.: 669,864

[22] Filed: Jun. 10, 1996

[51] Int. Cl.$^6$ .......................... C09K 7/02; C10M 113/00; B01J 13/00
[52] U.S. Cl. .......................... 507/119; 507/131; 507/133; 507/135; 507/138; 507/140; 252/312; 508/388; 508/393; 508/460; 508/469; 508/569; 508/570
[58] Field of Search .......................... 507/119, 131, 507/133, 135, 138, 140; 252/312; 508/388, 393, 460, 469, 569, 570

[56] References Cited

U.S. PATENT DOCUMENTS

| | | | |
|---|---|---|---|
| 4,036,766 | 7/1977 | Yamamoto et al. | 252/51.5 A |
| 4,123,368 | 10/1978 | Leister | 508/469 |
| 4,230,586 | 10/1980 | Bretz et al. | 252/8.5 P |
| 4,268,641 | 5/1981 | Koenig et al. | 525/367 |
| 4,301,016 | 11/1981 | Carriere et al. | 252/8.5 C |
| 4,429,097 | 1/1984 | Chang et al. | 526/317 |
| 4,548,982 | 10/1985 | Clark, Jr. et al. | 524/556 |
| 4,582,543 | 4/1986 | Bretz | 507/131 |
| 4,615,813 | 10/1986 | Bretz | 507/131 |
| 4,663,385 | 5/1987 | Chang et al. | 524/556 |
| 4,715,971 | 12/1987 | Blair | 252/8.51 |
| 4,745,154 | 5/1988 | Ruffner | 524/801 |
| 4,938,881 | 7/1990 | Ripple et al. | 252/32.7 E |
| 4,981,603 | 1/1991 | Demange | 252/33 |
| 5,213,697 | 5/1993 | Vinci et al. | 252/18 |
| 5,223,163 | 6/1993 | Coolbaugh | 252/33.3 |
| 5,308,547 | 5/1994 | Burba, III et al. | 252/315.2 |
| 5,314,632 | 5/1994 | Papke et al. | 252/18 |
| 5,354,485 | 10/1994 | Tipton et al. | 252/34 |
| 5,401,424 | 3/1995 | Vinci et al. | 252/18 |

Primary Examiner—Philip Tucker
Attorney, Agent, or Firm—James L. Cordek; Joseph P. Fischer

[57] ABSTRACT

An oil in water dispersion composition is disclosed that comprises a mixture of water and (A) an overbased non-Newtonian colloidal disperse system comprising
(1) solid metal-containing colloidal particles predispersed in
(2) a disperse medium of at least one inert organic liquid and
(3) at least one member selected from the class consisting of organic compounds which are substantially soluble in the disperse medium, where the molecules of said organic compound have polar substituents and hydrophobic portions;

(B) a water soluble associative thickener comprising a base-neutralized copolymer having copolymerized therein about 90 to about 99 mole percent of a carboxyl-containing, ethylenically unsaturated hydrocarbon and about 1 to about 10 mole percent of a nonionic surfactant acrylate having the formula:

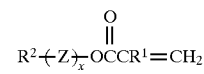

wherein $R^1$ is hydrogen or methyl, $R^2$ is a hydrophobe selected from the group consisting of alkyl and

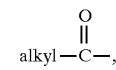

wherein the alkyl contains 4 to 30 carbon atoms, Z is a divalent radical selected from the group consisting of oxyethylene units or mixed oxyalkylene units having the general formula:

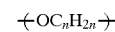

where n is an integer having values from 2 to 4 and x is an integer having values of about 5 to 40; and (C) at least one dispersant.

36 Claims, No Drawings

ANTI-SETTLING LUBRICITY AGENT FOR WATER/OIL DISPERSION COMPOSITIONS

FIELD OF THE INVENTION

The present invention relates to a water-based drilling mud that contains an overbased, gelled and rebased metal sulfonate or carboxylate, an associative thickener and a dispersant. In another aspect, this invention relates to an oil in water dispersion composition which exhibits improved storage stability.

BACKGROUND OF THE INVENTION

The primary functions of a drilling mud are: to carry chips and cuttings produced by drilling to the surface; to lubricate and cool the drill bit and drill string; to form a filter cake which obstructs filtrate invasion in the formation; to maintain the walls of the borehole; to control formation pressures and prevent lost returns; to suspend cuttings during rig shutdowns; and to protect the formation for later successful completion and shutdown.

U.S. Pat. No. 4,036,766 (Yamamoto et al., July 19, 1977) relates to a complex reaction product of an interpolymer of dialkylaminoalkyl methacrylate, $C_1$–$C_6$ alkyl methacrylate, $C_{10}$–$C_{14}$ alkyl methacrylate, and $C_{16-20}$ alkyl methacrylate, and a liquid poly(alkene-1) of a molecular weight of between about 200 and 10,000 wherein the alkene-1 monomer is of from 3 to 12 carbons, prepared by polymerizing the monomeric components of the interpolymer in the presence of said poly(alkene-1) which not only results in a product of good VI improving properties but also a product which has improved dispersant and antioxidant properties when incorporated in automatic transmission and crankcase fluids for a given nitrogen content.

U.S. Pat. No. 4, 230,586 (Bretz et al., October 28, 1980) relates to aqueous well-drilling fluids. More particularly it relates to fluids containing additives comprising colloidal disperse systems and emulsifiers. Such additives provide lubricity to the drilling fluids and thus allow rotary drilling operations to be carried out at reduced torque. Methods of carrying out drilling operations using these drilling fluids are also within the scope of this reference.

U.S. Pat. No. 4,268,641 (Koenig et al., May 19, 1981) relates to a normally solid, base-neutralized copolymer having copolymerized therein about 90 to about 99 mole percent of a carboxyl-containing ethylenically unsaturated hydrocarbon and about 1 to about 10 mole percent of a nonionic surfactant acrylate having the formula:

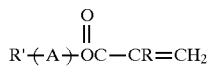

where R is hydrogen or methyl, R' is a hydrophobe which can be alkyl—O—, alkyl—NH—, or alkyl—CO—, where the alkyl contains r to about 30 carbon atoms, A is a divalent radical selected from the group consisting of oxyethylene units or mixed oxyalkylene units having the general formula

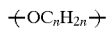

wherein n is an integer having values from 2 to 4 and x is an integer having values of about 5 to about 40, said surfactant acrylate having an HLB value of about 10 to about 19.

U.S. Pat. No. 4,301,016 (Carriere et al., Nov. 17, 1981) provides a method for drilling a borehole wherein a drilling fluid is circulated within the borehole during the drilling. The drilling fluid employed in the improved method comprises an aqueous composition which contains an effective amount of an emulsion polymerized latex comprised of an interpolymer of an olefinically unsaturated carboxylic acid monomer and at least one other, non-carboxylated polymerizable monomer. The emulsion polymerized latex is characterized in that aqueous dispersion of the latex containing 0.5 lbs. of polymer solids per barrel of the dispersion have an API apparent viscosity, in a pH range above about 6, which is at least 300% greater than the API apparent viscosity of the dispersion in a pH range below about 6.

U.S. Pat. Nos. 4,429,097 and 4,663,385 (Chang et al., Jan. 31, 1984 and May 5, 1987, respectively) relate to copolymers and to a process of thickening aqueous systems with copolymers, especially emulsion copolymers, to enhancement of such thickening by the addition of surfactants, and to other aspects including coating compositions and other aqueous systems thickened with the polymers U.S. Pat. No. 4,548,982 (Clark, Jr. et al., Oct. 22, 1985) relates to polymers which are employed with drilling fluids as water loss additives. Preferably, those polymers are derived from copolymerizing a hydrophilic vinyl monomer selected from amine acrylic acid (AA), methacrylic acid (MAA), other related monomers and mixtures of any two or more thereof with at least one hydrophobic vinyl monomer selected from among acrylic acid esters, such as, for example, methyl acrylate and ethyl acrylate, methacrylic acid esters, such as, for example, methyl acrylate and ethyl methacrylate, vinyl esters of saturated monocarboxylic acids having 1 to 3 carbon atoms, such as, for example, vinyl formate and vinyl acetate, other related monomers, and mixtures or combinations of any two or more thereof. Presently preferred polymers of this invention are those selected from among an acrylic acid-methyl methacrylate copolymer (AA—MAA), a methacrylic acid-methyl acrylate copolymer (MAA—MA), a methacrylic acid-methyl acrylate copolymer (MAA—MAA), an acrylic acid-vinyl acetate copolymer (AA—VA), and an acrylic acid-methyl methacrylate-vinyl acetate terpolymer (AA—MAA—VA).

U.S. Pat. No. 4,715, 971 (Blair, Dec. 29, 1987) provides a well drilling and completion composition having a potassium salt of a copolymer of a first compound with a formula $CH_2=CR_1$—COOH wherein $R_1$ is selected from the group consisting of H, and an alkyl having 1 to 4 carbon atoms, and a second compound having a formula $CH_2=CH$—$COOR_2$ wherein $R_2$ is selected from the group consisting of an alkyl radical and a hydroxyalkyl radical wherein the alkyl and hydroxy each have 1 to 4 carbon atoms. The well drilling and completion composition of this invention also has an accelerator catalyst which includes water, KOH, lignite, sulfonated polystyrene, and a vinylsulfonate/vinylamide copolymer if the temperature of the system is above 285° F.

U.S. Pat. No. 4,745,154 (Ruffner, May 17, 1988) provides a water soluble copolymer composition obtained by polymerizing in a water-in-oil emulsion a monomer system comprising:

a. an addition copolymerizable surfactant monomer; and
b. at least one water soluble vinyl monomer.

U.S. Pat. No. 4,938,881 (Ripple et al., Jul. 3, 1990) relates to lubricating oil compositions comprising an oil of lubricating viscosity, a carboxylic derivative composition exhibiting both VI and dispersant properties, at least one basic alkali metal salt of a sulfonic or carboxylic acid, and at least one metal salt of a dithiophosphoric acid.

U.S. Pat. No. 4,981,603 (Demange, Jan. 1, 1991) relates generally to methods for blending additive components comprising dispersant additives and overbased alkaline earth metal detergent additives into base oil to obtain a lubricating oil additive concentrate ("D/I" package) in which the dispersant and overbased detergent have improved compatibility. More particularly, this reference relates to a method for improving DI package compatibility of the dispersant and the basic magnesium containing detergents which comprises the steps of: (1) preparing a mixture comprising (a) the dispersant; (b) the detergent; and (c) a substantially inert solvent; and (2) blending said mixture at a temperature within the range of about 150° F.–380° F. for a period of time sufficient to render the mixture substantially free of haze and sediment, said method being subject to the proviso that the mixture prepared in step (1) be free of other additive ingredients susceptible to thermal decomposition in the blending of step (2). The pre-blended mixture of dispersant and detergent, when blended with other DI package additive such as oxidation inhibitors, wear inhibitors, etc., results in a DI package having little or no haze and sediment, both initially and on aging.

U.S. Pat. No. 5,213,697 (Vinci et al., May 25, 1993) relates to a method for reducing friction between railroad wheel and railway track comprising applying to the railway track a friction-reducing and wear-reducing composition. The composition comprises a metal overbased non-Newtonian colloidal disperse system comprising solid metal-containing colloidal particles predispersed in a disperse medium of at least one inert organic liquid and at least one member selected from the class consisting of organic compounds which are substantially soluble in the disperse medium, the molecules of said organic compound being characterized by polar substituents and hydrophobic portions.

U.S. Pat. No. 5,223,163 (Coolbaugh, Jun. 29, 1993) is directed to improved overbased metal derivatives of phenates which have a high alkalinity, and improved viscosity properties. The reference is also directed to an improved method of making the phenates which is commercially practical. Specifically, the reference is directed to highly alkaline low viscosity overbased phenates comprising the overbased reaction product of a source of alkylated phenol, and a source of an alkali or alkaline earth metal containing reagent which is overbased in the presence of a dispersant composition and a carboxylic acid or its derivative. The reference is also directed to a process for preparing overbased metal phenates which comprises the reaction product of a source of alkylated phenol, a source of an alkali or alkaline earth metal and a dispersant which is overbased in the presence of carboxylic acid or its derivative.

U.S. Pat. No. 5,308,547 (Burba, III et al., May 3, 1994) relates to the reaction product of clay mineral, such as sodium bentonite, and a mixed metal layered hydroxide. This composition has utility as a gelling agent of, for example, a drilling fluid, or other thixotropic fluid. The mixed metal layered hydroxide compound has the following empirical formula:

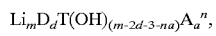

where
m represents the number of Li ions present;
D represents divalent metals icons; and
d is the number of ions of D in the formula;
T represents trivalent metal ions;
A represents monovalent or polyvalent anions other than OH ions;
a is the number of ions of A in the formula;

n is the valence of A; and
where (m+2d+3+na) is equal to or greater than 3.

U.S. Pat. No. 5,314,632 (Papke et al., May 24, 1994) concerns a process for making a lubricant composition. The process involves combining dispersant VI polymer with detergent to make a premix. The dispersant VI polymer is a polyolefin of ethylene, $C_{3-20}$ α-monoolefin, and optionally polyene, having a number average molecular weight of at least about 10,000, which is grafted with ethylenically unsaturated, carboxyl-containing compound and dispersancy substituent. The detergent is an overbased, oil soluble, metal salt. Lubricating oil and dispersant package are then combined with the premix to make a lubricant composition with enhanced viscosification.

U.S. Pat. No. 3,354,485 (Tipton et al., Oct. 11, 1994) relates to a composition comprising a major amount of an oil of lubricating viscosity, and (A) an organic ammonium thiosulfate. The lubricating composition is either free of added lead containing compounds or additionally contains (B) a phosphorus or boron antiwear/extreme pressure agent, or both. The reference also includes greases and aqueous fluids containing organic ammonium thiosulfates. These compositions have improved antiwear, antiweld, extreme pressure and/or friction properties.

U.S. Pat. No. 5,401,424 (Vinci et al., Mar. 28, 1995) provides a process for preparing a gelled overbased material, comprising the steps of preparing a mixture of (i) a fluid carbonated overbased material in an oleophilic medium, which mixture contains a metal salt of at least one organic acid material containing at least 8 carbon atoms and a metal salt of at least one organic acid material containing fewer than 6 carbon atoms, and (ii) an alcohol or an alcohol-water mixture; and heating the mixture.

SUMMARY OF THE INVENTION

An oil in water dispersion composition is disclosed which comprises a mixture of water and (A) an overbased non-Newtonian colloidal disperse system comprising (1) solid-metal containing colloidal particles predispersed in
(2) a disperse medium of at least one inert organic liquid and
(3) at least one member selected from the class consisting of organic compounds which are substantially soluble in the disperse medium, where the molecules of said organic compound have polar substituents and hydrophobic portions;
(B) a water soluble associative thickener comprising a base-neutralized copolymer having a copolymerized therein about 90 to about 99 mole percent of a carboxyl-containing, ethylenically unsaturated hydrocarbon and about 1 to about 10 mole percent of a nonionic surfactant acrylate having the formula:

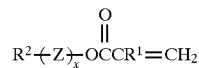

wherein $R^1$ is hydrogen or methyl, $R^2$ is a hydrophobe selected from the group consisting of alkyl and

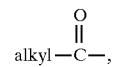

wherein the alkyl contains 4 to 30 carbon atoms, Z is a divalent radical selected from the group consisting of oxyethylene units or mixed oxyalkylene units having the general formula:

where n is an integer having values from 2 to 4 and x is an integer having values of about 5 to 40; and (C) at least one dispersant.

DETAILED DESCRIPTION OF THE INVENTION

The term "oil-in-water" dispersion refers to a substantially liquid oil in water emulsion and suspended solids within the oil in water emulsion. In oil-in-water'emulsions, the continuous phase is water and the discontinuous phase is oil. The discontinuous oil phase is dispersed in the continuous water phase.

(A) The Overbased non-Newtonian Colloidal Disperse System

The overbased non-Newtonian colloidal disperse system comprises three parts. They are:

(1) Solid metal-containing colloidal particles predispersed in (2) a disperse medium of at least one inert organic liquid and (3) at least one member selected from the class consisting of organic compounds which are substantially soluble in the disperse medium, where the molecules of said organic compound have polar substituents and hydrophobic portions.

Overbased materials are characterized by a metal content in excess of that which would be present according to the stoichiometry of the metal and the particular organic compound reacted with the metal, e.g., a carboxylic or sulfonic acid. Thus, if a monocarboxylic acid,

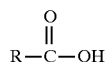

is neutralized with a basic metal compound, e.g., calcium hydroxide, the "normal" metal salt produced will contain one equivalent of calcium for each equivalent of acid, i.e.,

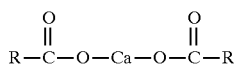

However, as is well known in the art, various processes are available which result in an inert organic liquid solution of a product containing more than the stoichiometric amount of metal. The solutions of these products are referred to herein as overbased materials. Following these procedures, the carboxylic acid or an alkali or alkaline earth metal salt thereof can be reacted with a metal base and the product will contain an amount of metal in excess of that necessary to neutralize the acid, for example, 4.5 times as much metal as present in the normal salt or a metal excess of 3.5 equivalents The actual stoichiometric excess of metal can vary considerably, for example, from about 0.1 equivalent to about 50 or more equivalents depending on the reactions, the process conditions, and the like. The overbased materials useful in accordance with the present invention contain from about 1.1 to about 40 or more equivalents of metal for each equivalent of material which is overbased.

In the present specification and claims the term "overbased" is used to designate materials containing a stoichiometric excess of metal and is, therefore, inclusive of those metals which have been referred to in the art as overbased, superbased, hyperbased, etc., as discussed supra.

The terminology "metal ratio" is used in the references and herein to designate the ratio of the total chemical equivalents of the metal in the overbased material (e.g., a metal sulfonate or carboxylate) to the chemical equivalents of the metal in the product which would be expected to result in the reaction between the organic material to be overbased (e.g., sulfonic or carboxylic acid) and the metal- containing reactant (e.g., calcium hydroxide, barium oxide, etc.) according to the known chemical reactivity and stoichiometry of the two reactants. Thus, in the normal calcium carbonate discussed above, the metal ratio is one, and in the overbased carbonate, the metal ratio may be 4.5. Obviously, if there is present in the material to be overbased more than one compound capable of reacting with the metal, the "metal ratio" of the product will depend upon whether the number of equivalents of metal in the overbased product is compared to the number of equivalents expected to be present for a given single component or a combination of all such components.

Generally, overbased materials are prepared by treating a reaction mixture comprising the organic material to be overbased, a reaction medium consisting essentially of at least one inert, organic solvent for said organic material, a stoichiometric excess of a metal base, and a promoter with an acidic material. The methods for preparing the overbased materials for use in the present invention, as well as an extremely diverse group of overbased materials, are well known in the art.

An important characteristic of the organic materials which are overbased is their solubility in the particular reaction medium utilized in the overbasing process. As the reaction medium used previously has normally comprised petroleum fractions, particularly mineral oils, these organic materials have generally been oil-soluble. However, if another reaction medium is employed (e.g. aromatic hydrocarbons, aliphatic hydrocarbons, kerosene, etc.) it is not essential that the organic material be soluble in mineral oil as long as it is soluble in the given reaction medium. Obviously, many organic materials which are soluble in mineral oils will be soluble in many of the other indicated suitable reaction mediums. It should be apparent that the reaction medium usually becomes the disperse medium of the colloidal disperse system or at least a component thereof depending on whether or not additional inert organic liquid is added as part of the reaction medium or the disperse medium.

Materials which can be overbased are generally oil-soluble organic acids including phosphorus acids, thiophosphorus acids, sulfur acids, carboxylic acids, thiocarboxylic acids, and the like, as well as the corresponding alkali and alkaline earth metal salts thereof.

The organic liquids used as the disperse medium in the colloidal disperse system can be used as solvents for the overbasing process. The metal compounds used in preparing the overbased materials are normally the basic salts of metals in Group I-A and Group II-A of the Periodic Table, although other metals such as lead, zinc, manganese, etc., can be used in the preparation of overbased materials. The anionic portion of the salt can be hydroxyl, oxide, carbonate, hydrogen carbonate, nitrate, sulfite, hydrogen sulfite, halide, amide, sulfate, etc., as disclosed in the above-cited patents. For purposes of this invention the preferred overbased materials are prepared from the alkaline earth metal oxides, hydroxides, and alcoholates such as the alkaline earth metal lower alkoxides. The more preferred disperse systems of the invention are made from overbased materials containing calcium, magnesium, sodium, lithium, and/or barium as the metal, and, from the standpoint of environmental safety and cost, the most preferred disperse systems of the invention are made from overbased materials containing calcium and/or sodium.

The promoters, that is, the materials which permit the incorporation of the excess metal into the overbased material, are also quite diverse and well known in the art. Alcoholic promoters include the alkanols of one to about eighteen carbon atoms, preferably one to about twelve carbon atoms, and more preferably one to about five carbon atoms, such as methanol, ethanol, n-butanol, amyl alcohol, octanol, isopropanol, isobutanol, and mixtures of these and the like. Phenolic promoters include a variety of hydroxy-substituted benzenes and naphthalenes. Mixtures of various promoters are sometimes used.

Included within the known group of useful acidic materials are liquid acids such as formic acid, acetic acid, nitric acid, sulfuric acid, hydrochloric acid, hydrobromic acid, carbamic acid, substituted a very useful acidic material, although inorganic acidic materials such as HCl, $SO_2$, $SO_3$, $CO_2$, $H_2S$, $N_2O_3$, etc., are ordinarily employed as the acidic materials. The most preferred acidic materials are carbon dioxide and acetic acid.

In preparing overbased materials, the material to be overbased, an inert, non- polar, organic solvent therefor, the metal base, the promoter and the acidic material are brought together and a chemical reaction ensues. The exact nature of the resulting overbased product is not known. However, it can be adequately described for purposes of the present specification as a single phase homogeneous mixture of the solvent and (1) either a metal complex formed from the metal base, the acidic material, and the material being overbased and/or (2) an amorphous metal salt formed from the reaction of the acidic material with the metal base and the material which is said to be overbased. Thus, if mineral oil is used as the reaction medium, carboxylic acid as the material which is overbased, $Ca(OH)_2$ as the metal base, and carbon dioxide as the acidic material, the resulting overbased material can be described for purposes of this invention as an oil solution of either a metal containing complex of the acidic material, the metal base, and the carboxylic acid or as an oil solution of amorphous calcium carbonate and calcium carboxylate.

The temperature at which the acidic material is contacted with the remainder of the reaction mass depends to a large measure upon the promoting agent used. With a phenolic promoter, the temperature usually ranges from about 80° C. to 300° C., and preferably from about 100° C. to about 200° C. When an alcohol or mercaptan is used as the promoting agent, the temperature usually will not exceed the reflux temperature of the reaction mixture and preferably will not exceed about 100° C.

In view of the foregoing, it should be apparent that the over-based materials may retain all or a portion of the promoter. That is, if the promoter is not volatile (e.g., an alkyl phenol) or otherwise readily removable from the overbased material, at least some promoter remains in the overbased product. Accordingly, the disperse systems made from such products may also contain the promoter. The presence or absence of the promoter in the overbased material used to prepare the disperse system and likewise, the presence or absence of the promoter in the colloidal disperse systems themselves does not represent a critical aspect of the invention. Obviously, it is within the skill of the art to select a volatile promoter such as a lower alkanol, e.g., methanol, ethanol, etc., so that the promoter can be readily removed prior to incorporation with the compositions of the present invention to forming the disperse system or thereafter.

The terminology "disperse system" as used in the specification and claims is a term of art generic to colloids or colloidal solutions, e.g., "any homogeneous medium containing dispersed entities of any size and state," Jirgensons and Straumanis, "A Short Textbook on Colloidal Chemistry" (2nd Ed.) The Macmillan Co., N.Y., 1962 at page 1. However, the particular disperse systems of the present invention form a subgenus within this broad class of disperse system, this subgenus being characterized by several important features.

This subgenus comprises those disperse systems wherein at least a portion of the particles dispersed therein are solid, metal-containing particles formed in situ. At least about 10% to about 50% are particles of this type and preferably substantially all of said solid particles are formed in situ.

So long as the solid particles remain dispersed in the dispersing medium as colloidal particles, the particle size is not critical. Ordinarily, the particles will not exceed a number average particle size of 5.0 microns. However, it is preferred that the number average particle size be less than or equal to about 2.0 microns. In a more preferred aspect of the invention, the number average particle size is less than or equal to 2.0 microns and more than 80 number percent of the solid metal- containing particles have a particle size less than 5.0 microns. In a particularly preferred aspect of the invention, the number average particle size is less than or equal to 1.0 micron and more than 80 number percent of the solid metal-containing particles have a particle size less than about 2.0 microns.

The number average particle size is the sum of the particle size of the solid metal-containing colloidal particles per unit volume divided by the number of particles in the unit volume. This average particle size determination may be made using, for example, an instrument known as a Nicomp Model 270 commercially available from Specific Scientific Co., which uses quasi elastic light scattering (i.e., QELS), a laser light scattering method for determining particle size which is well known to those of ordinary skill in the colloidal dispersion art.

Systems having a number average unit particle size of less than or equal to 2.0 microns, are preferred, and those having a number average unit particle size less than or equal to 1.0 micron is more preferred. Systems having a unit particle size in the range from 0.03 micron to 0.5 micron give excellent results. The minimum unit particle size is at least 0.02 micron and preferably at least 0.03 micron.

The language "unit particle size", as opposed to "particle size", is intended to designate the average particle size of the solid, metal-containing particles assuming maximum dispersion of the individual particles throughout the disperse medium. That is, the unit particle is that particle which corresponds in size to the average size of the metal-containing particles and is capable of independent existence within the disperse system as a discrete colloidal particle. These metal-containing particles are found in two forms in the disperse systems of the present invention. Individual unit particles can be dispersed as such throughout the medium or unit particles can form an agglomerate, in combination with other materials (e.g., another metal-containing particle, the disperse medium, etc.) which are present in the disperse systems. These agglomerates are dispersed through the system as "metal-containing particles". Obviously, the "particle size" of the agglomerate is substantially greater than the unit particle size.

Furthermore, it is equally apparent that this agglomerate size is subject to wide variations, even within the same disperse system. The agglomerate size varies, for example, with the degree of shearing action employed in dispersing the unit particles. That is, mechanical agitation of the disperse system tends to break down the agglomerates into the individual components thereof and disperse these individual components throughout the disperse medium. The ultimate in dispersion is achieved when each solid, metal-containing particle is individually dispersed in the medium.

Accordingly, the disperse systems may be characterized with reference to the unit particle size, it being apparent to those skilled in the art that the unit particle size represents the average size of solid, metal-containing particles present in the system which can exist independently. The number average particle size of the metal- containing solid particles in the system can be made to approach the unit particle size value by the application of a shearing action to the existent system or during the formation of the disperse system as the particles are being formed in situ. It is not necessary that maximum particle dispersion exist to have useful disperse systems. The agitation associated with homogenization of the overbased material and conversion agent produces sufficient particle dispersion.

Basically, the solid metal-containing particles are in the form of metal salts of inorganic acids, and low molecular weight organic acids, hydrates thereof, or mixtures of these. These salts are usually the alkali and alkaline earth metal formates, acetates, carbonates, sulfides, sulfites, sulfates, thiosulfates, and halides, among which the carbonates are preferred. In other words, the metal-containing particles are ordinarily particles of metal salts, the unit particle is the individual salt particle and the unit particle size is the average particle size of the salt particles which is readily ascertained, as for example, by conventional X-ray diffraction techniques or laser light scattering, such as the above-mentioned QELS technique. Colloidal disperse systems possessing particles of this type are sometimes referred to as macromolecular colloidal systems.

Because of the composition of the colloidal disperse systems of this invention, the metal-containing particles also exist as components in micellar colloidal particles. In addition to the (1) solid metal-containing particles and (2) the disperse medium, the colloidal disperse systems of the invention are characterized by a third component, one which is soluble in the medium and contains in the molecules thereof a hydrophobic portion and at least one polar substituent. This third component can orient itself along the external surfaces of the above metal salts, the polar groups lying along the surface of these salts with the hydrophobic portions extending from the salts into the disperse medium forming micellar colloidal particles. These micellar colloids are formed through weak intermolecular forces, e.g., Van der Waals forces, etc. Micellar colloids represent a type of agglomerate particle as discussed hereinabove. Because of the molecular orientation in these micellar colloidal particles, such particles are characterized by a metal containing layer (i.e., the solid metal-containing particles and any metal present in the polar substituent of the third component, such as the metal in a sulfonic or carboxylic acid salt group), a hydrophobic layer formed by the hydrophobic portions of the molecules of the third component and a polar layer bridging said metal-containing layer and said hydrophobic layer, said polar bridging layer comprising the polar substituents of the third component of the system, e.g., the

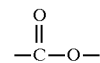

group if the third component is an alkaline earth metal carboxylate.

The second component of the colloidal disperse system is the dispersing medium. The identity of the medium is not a particularly critical aspect of the invention as the medium primarily serves as the liquid vehicle in which solid particles are dispersed. The medium can have components characterized by relatively low boiling points, e.g., in the range of 25° to 120° C. to facilitate subsequent removal of a portion or substantially all of the medium from the compositions of the invention or the components can have a higher boiling point to protect against removal from such compositions upon standing or heating. There is no criticality in an upper boiling point limitation on these liquids.

Representative liquids include mineral oils, alkanes of five to eighteen carbons, cycloalkanes of five or more carbons, corresponding alkyl-substituted cycloalkanes, aryl hydrocarbons, alkylaryl hydrocarbons, ethers such as dialkyl ethers, alkyl aryl ethers, cycloalkyl ethers, cycloalkylalkyl ethers, alkanols, alkylene glycols, polyalkylene glycols, alkyl ethers of alkylene glycols and polyalkylene glycols, dibasic alkanoic acid diesters, silicate esters, and mixtures of these. Specific examples include petroleum ether, Stoddard Solvent, pentane, hexane, octane, isooctane, undecane, tetradecane, cyclopentane, cyclohexane, isopropylcyclohexane, 1,4-dimethylcyclohexane, cyclooctane, benzene, toluene, xylene, ethyl benzene, tert-butyl-benzene, mineral oils, n-propylether, isopropylether, isobutylether, n-amylether, methyl-n-amylether, cyclohexylether, ethoxycyclohexane, methoxybenzene, isopropoxybenzene, p-methoxytoluene, methanol, ethanol, propanol, isopropanol, hexanol, n-octyl alcohol, n-decyl alcohol, alkylene glycols such as ethylene glycol and propylene glycol, diethyl ketone, dipropyl ketone, methylbutyl ketone, acetophenone, 1,2-difluorotetrachloroethane, dichlorofluoromethane, trichlorofluoromethane, acetamide, dimethylacetamide diethylacetamide, propionamide, diisooctyl azelate, ethylene glycol, polypropylene glycols, hexa-2-ethylbutoxy disiloxane, etc. Other dispersing media which may be used are mentioned in U.S. Pat. No. 4,468,339, column 9, line 29, to column 10, line 6, which is hereby incorporated by reference.

Also useful as dispersing media are the low molecular weight, liquid polymers, generally classified as oligomers, which include dimers, tetramers, pentamers, etc. Illustrative of this large class of materials are such liquids as the propylene tetramers, isobutylene dimers, low molecular weight polyolefins, such as poly( alpha -olefins), and the like.

From the standpoint of availability, cost, and performance, the alkyl, cycloalkyl, and aryl hydrocarbons represent a preferred class of disperse mediums. Liquid petroleum fractions represent another preferred class of disperse mediums. Included within these preferred classes are benzenes and alkylated benzenes, cycloalkanes and alkylated cycloalkanes, cycloalkenes and alkylated cycloalkenes such as found in naphthene-based petroleum fractions, and the alkanes such as found in the paraffin-based petroleum fractions. Petroleum ether, naphthas, mineral oils, Stoddard Solvent, toluene, xylene, etc., and mixtures thereof are examples of economical sources of suitable inert organic liquids which can function as the disperse medium in the colloidal disperse systems of the present invention. Mineral oil can serve by itself as the disperse medium and is preferred as an environmentally innocuous disperse medium.

In addition to the solid, metal-containing particles and the disperse medium, the disperse systems employed herein require a third component. This third component is an organic compound which is soluble in the disperse medium, and the molecules of which are characterized by a hydrophobic portion and at least one polar substituent. As explained, infra, the organic compounds suitable as a third component are extremely diverse. These compounds are inherent constituents of the disperse systems as a result of the methods used in preparing the systems. Further characteristics of the components are apparent from the following discussion of methods for preparing the colloidal disperse systems.

A preferred class of overbased materials used as starting materials in the preparation of the disperse systems of the present invention are the alkaline earth metal-overbased water-insoluble organic acids, preferably those containing at least eight aliphatic carbons although the acids may contain as few as six aliphatic carbon atoms if the acid molecule includes an aromatic ring such as phenyl, naphthyl, etc. Representative organic acids suitable for preparing these overbased materials are discussed and identified in detail in the above-cited patents. Particularly U.S. Pat. Nos. 2,616, 904 and 2,777,874 disclose a variety of very suitable organic acids.

For reasons of economy and performance, overbased carboxylic and sulfonic acids are particularly suitable.

Illustrative of the carboxylic acids are tall oil fatty acids, abietic acid, palmitic acid, palmitoleic acid, stearic acid, myristic acid, oleic acid, linoleic acid, linolenic acid, ricinoleic acid, behenic acid, tetrapropylene-substituted glutaric acid, polyisobutene substituted succinic acid, polypropylene-substituted succinic acid, octadecyl-substituted adipic acid, chlorostearic acid, 9-methylstearic acid, dichlorostearic acid, stearylbenzoic acid, eicosane-substituted naphthoic acid, dilauryl-decahydronaphthalene carboxylic acid, didodecyl-tetralin carboxylic acid, dioctyl-cyclohexane carboxylic acid, mixtures of these acids, their alkali and alkaline earth metal salts, and/or their anhydrides.

Of the sulfonic acids, the mono-, di-, and tri-aliphatic hydrocarbon substituted aryl sulfonic acids and the petroleum sulfonic acids (petrosulfonic acids) are particularly preferred. Illustrative examples of suitable sulfonic acids include mahogany sulfonic acids, petrolatum sulfonic acids, monoeicosane-substituted naphthalene sulfonic acids dodecylbenzene sulfonic acids, didodecylbenzene sulfonic acids, dinonylbenzene sulfonic acids, cetylchlorobenzene sulfonic acids, dilauryl beta-naphthalene sulfonic acids, the sulfonic acid derived by the treatment of polyisobutene having a molecular weight of 1500 with chlorosulfonic acid, nitronaphthalenesulfonic acid, paraffin wax sulfonic acid, cetyl-cyclopentane sulfonic acid, laurylcyclohexanesulfonic acids, polyethylene sulfonic acids, etc.

It is necessary that the size and number of aliphatic groups on the acids be sufficient to render the acids soluble. Normally the aliphatic groups will be alkyl and/or alkenyl groups such that the total number of aliphatic carbons is at least eight.

Within this preferred group of overbased carboxylic and sulfonic acids, the calcium, sodium, magnesium, lithium, and barium overbased mono-, di-, and tri- alkylated benzene and naphthalene (including hydrogenated forms thereof) petrosulfonic acids and higher fatty acids are preferred.

Illustrative of the synthetically produced alkylated benzene and naphthalene sulfonic acids are those containing alkyl substituents having from 8 to about 30 carbon atoms therein. Such acids include di-isododecylbenzene sulfonic acid, wax- substituted phenol sulfonic acid, wax-substituted benzene sulfonic acids, polybutene-substituted sulfonic acid, cetyl-chlorobenzene sulfonic acid, di-cetylnaphthalene sulfonic acid, di-lauryldiphenylether sulfonic acid, di-isononylbenzene sulfonic acid, di-isooctadecylbenzene sulfonic acid, stearylnaphthalene sulfonic acid, and the like. The petroleum sulfonic acids are a well known art recognized class of materials which have been used as starting materials in preparing overbased products since the inception of overbasing techniques as illustrated by the above patents. Petroleum sulfonic acids are obtained by treating refined or semi-refined petroleum oils with concentrated or fuming sulfric acid. These acids remain in the oil after the settling out of sludges. These petroleum sulfonic acids, depending on the nature of the petroleum oils from which they are prepared, are oil-soluble alkane sulfonic acids, alkyl-substituted cycloaliphatic sulfonic acids including cycloalkyl sulfonic acids and cycloalkene sulfonic acids, and alkyl, alkaryl, or aralkyl condensed aromatic nuclei as well as partially hydrogenated forms thereof. Examples of such petrosulfonic acids include mahogany sulfonic acid, white oil sulfonic acid, petrolatum sulfonic acid, petroleum naphthene sulfonic acid, etc.

The especially preferred group of aliphatic fatty acids includes the linear unsaturated higher fatty acids containing from about 8 to about 30 carbon atoms, more preferably from about 12 to about 22 carbon atoms, and most preferably from about 16 to about 20 carbon atoms. Illustrative of these acids are tall oil fatty acids, linoleic acid, abietic acid, linolenic acid, palmitoleic acid, oleic acid, and ricinoleic acid. Tall oil fatty acids are most preferred.

As shown by the representative examples of the preferred classes of sulfonic and carboxylic acids, the acids may contain nonhydrocarbon substituents such as halo, nitro, alkoxy, hydroxyl, and the like, although those having less than 5% by number nonhydrocarbon substituents are preferred.

It is desirable that the overbased materials used to prepare the disperse system have a metal ratio of at least about 1.1 and preferably about 4.0. An especially suitable group of the preferred sulfonic acid and carboxylic acid overbased materials has a metal ratio of at least about 7.0. While overbased materials having a metal ratio of 75 have been prepared, normally the maximum metal ratio will not exceed about 50 and, in most cases, not more than about 40.

The overbased materials used in preparing the colloidal disperse systems utilized in the compositions of the invention contain from about 10% to about 70% by weight of metal-containing components. As explained hereafter, the exact nature of these metal containing components is not known. It is theorized that the metal base, the acidic material, and the organic material being overbased form a metal complex, this complex being the metal-containing component of the overbased material. On the other hand, it has also been postulated that the metal base and the acidic material form amorphous metal compounds which are dissolved in the inert organic reaction medium and the material which is said to be overbased. The material which is overbased may itself be a metal-containing compound, e.g., a carboxylic or sulfonic acid metal salt. In such a case, the metal containing components of the overbased material would be both the amorphous compounds and the acid salt. The remainder of the overbased materials comprise the inert organic reaction medium and any promoter which is not removed from the overbased product. For purposes of this application, the organic material which is subjected to overbasing is considered a part of the metal-containing components. Normally, the liquid reaction medium constitutes at least about 30% by weight of the reaction mixture utilized to prepare the overbased materials.

As mentioned above, the colloidal disperse systems used in the composition of the present invention are prepared by homogenizing a "conversion agent" and the overbased starting material. Homogenization is achieved by vigorous agitation of the two components, preferably at the reflux temperature or a temperature slightly below the reflux temperature. The reflux temperature normally will depend upon the boiling point of the conversion agent. However, homogenization may be achieved within the range of about 25° C. to about 200° C. or slightly higher. Usually, there is no real advantage in exceeding 150° C.

The concentration of the conversion agent necessary to achieve conversion of the overbased material is usually within the range of from about 1% to about 80% based upon the weight of the overbased material, excluding the weight of the inert organic solvent and any promoter present therein. Preferably at least about 10% and usually less than about 60% by weight of the conversion agent is employed. Concentrations beyond 60% appear to afford no additional advantages.

The terminology "conversion agent" as used herein is intended to describe a class of very diverse materials which possess the property of being able to convert the Newtonian homogeneous, single-phase, overbased materials into non-Newtonian colloidal disperse systems. The mechanism by which conversion is accomplished is not completely understood. However, with the exception of carbon dioxide, these conversion agents all possess active hydrogens. The conversion agents include lower aliphatic carboxylic acids, water, aliphatic alcohols, cycloaliphatic alcohols, arylaliphatic alcohols, phenols, ketones, aldehydes, amines, boron acids, phosphorus acids, and carbon dioxide. Mixtures of two or more of these conversion agents are also useful. Particularly useful conversion agents are discussed below.

The lower aliphatic carboxylic acids are those containing less than about eight carbon atoms in the molecule. Examples of this class of acids are formic acid, acetic acid, propionic acid, butyric acid, valeric acid, isovaleric acid, isobutyric acid, caprylic acid, heptanoic acid, chloroacetic acid, dichloroacetic acid, trichloroacetic acid, etc. Formic acid, acetic acid, and propionic acid are preferred, with acetic acid being especially suitable. It is to be understood that the anhydrides of these acids are also useful and, for the purposes of the specification and claims of this invention, the term acid is intended to include both the acid per se and the anhydride of the acid.

Useful alcohols include aliphatic, cycloaliphatic, and arylaliphatic mono- and polyhydroxy alcohols. Alcohols having less than about twelve carbons are especially useful, while the lower alkanols, i.e., alkanols having less than about eight carbon atoms are preferred for reasons of economy and effectiveness in the process. Illustrative are the alkanols such as methanol, ethanol, isopropanol, n-propanol, isobutanol, tertiary butanol, isooctanol, dodecanol, n-pentanol, etc.; cycloalkyl alcohols exemplified by cyclopentathol, cyclohexanol, 4-methylcyclohexanol, 2-cyclohexylethanol, cyclopentylmethanol, etc.; phenyl aliphatic alkanols such as benzyl alcohol, 2-phenylethanol, and cinnamyl alcohol; alkylene glycols of up to about six carbon atoms and mono-lower alkyl ethers thereof such as monomethylether of ethylene glycol, diethylene glycol, ethylene glycol, trimethylene glycol, hexamethylene glycol, triethylene glycol, 1,4-butanediol, 1,4-cyclohexanediol, glycerol, and pentaerythritol.

The use of a mixture of water and one or more of the alcohols is especially effective for converting the overbased material to colloidal disperse systems. Such combinations often reduce the length of time required for the process. Any water- alcohol combination is effective, but a very effective combination is a mixture of one or more alcohols and water in a weight ratio of alcohol to water of from about 0.05:1 to about 24:1. Preferably, at least one lower alkanol is present in the alcohol component of these water-alkanol mixtures. Water-alkanol mixtures wherein the alcoholic portion is one or more lower alkanols are especially suitable.

Phenols suitable for use as conversion agents include phenol, naphthol, ortho-cresol, para-cresol, catechol, mixtures of cresol, para-tert-butylphenol, and other lower alkyl substituted phenols, meta-polyisobutene (M.W.-350)-substituted phenol, and the like.

Other useful conversion agents include lower aliphatic aldehydes and ketones, particularly lower alkyl aldehydes and lower alkyl ketones such as acetaldehydes, propionaldehydes, butyraldehydes, acetone, methylethyl ketone, diethyl ketone. Various aliphatic, cycloaliphatic, aromatic, and heterocyclic amines are also useful providing they contain at least one amino group having at least one active hydrogen attached thereto. Illustrative of these amines are the mono- and di-alkylamines, particularly mono- and di-lower alkylamines, such as methylamine, ethylamine, propylamine, dodecylamine, methyl ethylamine, diethylamine; the cycloalkylamines such as cyclohexylamine, cyclopentylamine, and the lower alkyl substituted cycloalkylamines such as 3-methylcyclohexylarnine; 1,4-cyclohexylenediamine; arylarnines such as aniline, mono-, di-, and tri-, lower alkyl substituted phenyl amines, naphthylamines, 1,4-phenylene diamines; lower alkanol amines such as ethanolamine and diethanolamine; alkylenediamines such as ethylene diamine, triethylene tetramine, propylene diamines, octamethylene diamines; and heterocyclic amines such as piperazine, 4-aminoethylpiperazine, 2-octadecyl-irnidazoline, and oxazolidine. Boron acids are also useful conversion agents and include boronic acids (e.g., alkyl-B(OH)$_2$ or aryl-B(OH)$_2$, boric acid (i.e., H$_3$BO$_3$), tetraboric acid, metaboric acid, and esters of such boron acids.

The phosphorus acids are useful conversion agents and include the various alkyl and aryl phosphinic acids, phosphinus acids, phosphonic acids, and phosphonous acids. Phosphorus acids obtained by the reaction of lower alkanols or unsaturated hydrocarbons such as polyisobutenes with phosphorus oxides and phosphorus sulfides are particularly useful, e.g., P$_2$O$_5$ and P$_2$S$_5$ Carbon dioxide can be used as the conversion agent. However, it is preferable to use this conversion agent in combination with one or more of the foregoing conversion agents. For example, the combination of water and carbon dioxide is particularly effective as a conversion agent for transforming the overbased materials into a colloidal disperse system.

As previously mentioned, the overbased materials are single phase homogeneous systems. However, depending on the reaction conditions and the choice of reactants in preparing the overbased materials, there sometimes are present in the product insoluble contaminants. These contaminants are normally unreacted basic materials such as calcium oxide, barium oxide, calcium hydroxide, barium hydroxide, or other metal base materials used as a reactant in preparing the overbased material. It has been found that a more uniform colloidal disperse system results if such contaminants are removed prior to homogenizing the overbased material with the conversion agents. Accordingly, it is preferred that any insoluble contaminants in the overbased materials be removed prior to converting the material in the colloidal system. The removal of such contaminants is easily accomplished by conventional techniques such as filtration or centrifugation. It should be understood, however, that the removal of these contaminants, while desirable for reasons just mentioned, is not an essential aspect of the invention and useful products can be obtained when overbased materials containing insoluble contaminants are converted to the colloidal disperse systems.

The conversion agents, or a proportion thereof, may be retained in the colloidal disperse system. The conversion agents are, however, not essential components of these disperse systems and it is usually desirable that as little of the conversion agents as possible be retained in the disperse systems. Since these conversion agents do not react with the overbased material in such a manner as to be permanently bound thereto through some type of chemical bonding, it is normally a simple matter to remove a major proportion of the conversion agents and, generally, substantially all of the conversion agents. Some of the conversion agents have physical properties which make them readily removable from the disperse systems. Thus, most of the free carbon dioxide gradually escapes from the disperse system during the homogenization process or upon standing thereafter. Since the liquid conversion agents are generally more volatile than the remaining components of the disperse system, they are readily removable by conventional devolatilization techniques, e.g., heating, heating at reduced pressures, and the like. For this reason, it may be desirable to select conversion agents which will have boiling points which are lower than the remaining components of the disperse system. This is another reason why the lower alkanols, mixtures thereof, and lower alkanol-water mixtures are preferred conversion agents.

Again, it is not essential that all of the conversion agent be removed from the disperse systems. In fact, useful disperse systems for employment in the resinous compositions of the invention result without removal of the conversion agents. However, from the standpoint of achieving uniform results, it is generally desirable to remove the conversion agents, particularly where they are volatile.

To better illustrate the colloidal disperse systems utilized in the invention, the procedure for preparing a preferred system is described below. Unless otherwise stated, all parts, percents, ratios, and the like are by weight, temperature is degrees Centigrade and room temperature (about 25° C.), and pressure is in atmospheres and about one atmosphere.

As stated above, materials for preparing an overbased product generally include (1) the organic material to be overbased, (2) an inert, nonpolar, organic solvent for the organic material, (3) a metal base, (4) a promoter, and (5) an acidic material. In this example, these materials are (1) calcium petrosulfonate, (2) mineral oil, (3) calcium hydroxide, (4) a mixture of methanol, isobutanol, and n-pentanol, and (5) carbon dioxide.

A reaction mixture of 1305 grams of calcium sulfonate having a metal ratio of 2.5 dissolved in mineral oil, 220 grams of methyl alcohol, 72 grams of isobutanol, and 38 grams of n-pentanol is heated to 35° C. and subjected to the following operating cycle four times: mixing with 143 grams of 90% calcium hydroxide and treating the mixture with carbon dioxide until it has a neutralization base number of 32–39 when referenced against a phenolphthalein indicator. The resulting product is then heated to 155° C. during a period of 9 hours to remove the alcohols and then filtered at this temperature. The filtrate is a calcium overbased petrosulfonate having a metal ratio of 12.2.

A mixture of 150 parts of the foregoing overbased material, 15 parts of methyl alcohol, 10.5 parts of n-pentanol and 45 parts of water is heated under reflux conditions at 71°–74° C. for 13 hours. The mixture becomes a gel. It is then heated to 144° C. over a period of 6 hours and diluted with 126 parts of mineral oil having a viscosity of 2000 SUS at 100° C. and the resulting mixture heated at 144° C for an additional 4.5 hours with stirring. This thickened product is a colloidal disperse system of the type contemplated by the present invention.

The disperse systems are characterized by three components: (1) solid metal-containing particles formed in situ, (2) an inert, non-polar, organic liquid which functions as the disperse medium, and (3) an organic compound which is soluble in the disperse medium and the molecules of which are characterized by a hydrophobic portion and at least one polar substituent. In the colloidal disperse system described immediately above, these components are as follows: (1) calcium carbonate in the form of solid particles, (2) mineral oil, and (3) calcium petrosulfonate.

From the foregoing example, it is apparent that the solvent for the material which is overbased becomes the colloidal disperse medium or a component thereof. Of course, mixtures of other inert liquids can be substituted for the mineral oil or used in conjunction with the mineral oil prior to forming the overbased material.

It is also readily seen that the solid metal-containing particles formed in situ possess the same chemical composition as would the reaction products of the metal base and the acidic material used in preparing the overbased materials. Thus, the actual chemical identity of the metal containing particles formed in situ depends upon both the particular metal base or bases employed and the particular acidic material or materials reacted therewith. For example, if the metal base used in preparing the overbased material were calcium oxide and if the acidic material was a mixture of formic and acetic acids, the metal-containing particles formed in situ would be calcium formates and calcium acetates.

However, the physical characteristics of the particles formed in situ in the conversation step are quite different from the physical characteristics of any particles present in the homogeneous single-phase overbased material which is subjected to the conversion. Particularly, such physical characteristics as particle size and structure are quite different. The solid metal-containing particles of the colloidal disperse systems are of a size sufficient for detection by X-ray diffraction. The overbased material prior to conversion is not characterized by the presence of these detectable particles.

X-ray diffraction and electron microscope studies have been made of both overbased organic materials and colloidal disperse systems prepared therefrom. These studies establish the presence in the disperse systems of the solid metal-containing salts. For example, in the disperse system prepared according to the above, the calcium carbonate is present as solid calcium carbonate having a particle size of about 40 to 50 Angstrom (unit particle size) and interplanar spacing (d Angstrom) of 3.035. But X-ray diffraction studies of the overbased material from which it was prepared indicate the absence of calcium carbonate of this type. In fact, calcium carbonate present as such, if any, appears to be amorphous and in solution. While applicant does not intend to be bound by any theory offered to explain the changes which accompany the conversion step, it appears that conversion permits particle formation and growth. That is, the amorphous, metal-containing, apparently dissolved salts or complexes present in the overbased material form solid, metal-containing particles which by a process of particle growth become colloidal particles. Thus, in the above example, the dissolved amorphous calcium carbonate salt or complex is transformed into solid particles which then "grow". In this example, they grow to a size of 40 to 50 Angstrom. In many cases, these particles apparently are crystallites.

Regardless of the correctness of the postulated mechanism for in situ particle formation, the fact remains that no particles of the type predominant in the disperse systems are found in the overbased materials from which they are prepared. Accordingly, they are unquestionably formed in situ during conversion.

As these solid metal-containing particles formed in situ come into existence, they do so as pre-wet, pre-dispersed solid particles which are inherently uniformly distributed throughout the other components of the disperse system. The liquid disperse medium containing these pre-wet dispersed particles is readily incorporated into various polymeric compositions thus facilitating the uniform distribution of the particles throughout the polymeric resin composition. This pre-wet, pre-dispersed character of the solid metal-containing particles resulting from their in situ formation is, thus, an important feature of the disperse systems.

In the foregoing example, the third component of the disperse system (i.e., the organic compound which is soluble in the disperse medium and which is characterized by molecules having a hydrophobic portion and a polar substituent) is calcium petrosulfonate,

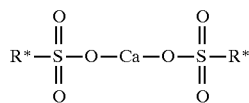

wherein R* is the residue of the petrosulfonic acid. In this case, the hydrophobic portion of the molecule is the hydrocarbon moiety of petrosulfonic, i.e., R*. The polar substituent is the metal salt moiety,

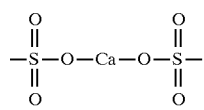

The hydrophobic portion of the organic compound is a hydrocarbon radical or a substantially hydrocarbon radical containing at least about eight aliphatic carbon atoms. Usually the hydrocarbon portion is an aliphatic or cycloaliphatic hydrocarbon radical although aliphatic or cycloaliphatic substituted aromatic hydrocarbon radicals are also suitable. In other words, the hydrophobic portion of the organic compound is the residue of the organic material which is overbased minus its polar substituents. For example, if the material to be overbased is a carboxylic acid, sulfonic acid, or phosphorus acid, the hydrophobic portion is the residue of these acids which would result from the removal of the acid functions. Similarly, if the material to be overbased is a phenol, a nitro-substituted polyolefin, or an amine, the hydrophobic portion of the organic compound is the radical resulting from the removal of the hydroxyl, nitro, or amino group respectively. It is the hydrophobic portion of the molecule which renders the organic compound soluble in the solvent used in the overbasing process and later in the disperse medium.

Obviously, the polar portions of these organic compounds are the polar substituents such as the acid salt moiety discussed above. When the material to be overbased contains polar substituents which will react with the basic metal compound used in overbasing, for example, acid groups such as carboxy, sulfino, hydroxysulfonyl, and phosphorus acid groups or hydroxyl groups, the polar substituent of the third component is the polar group formed from the reaction. Thus, the polar substituent is the corresponding acid metal salt group or hydroxyl group metal derivative, e.g., an alkali or alkaline earth metal sulfonate, carboxylate, sulfinate, alcoholate, or phenate.

On the other hand, some of the materials to be overbased contain polar substituents which ordinarily do not react with metal bases. These substituents include nitro, amino, ketocarboxyl, carboalkoxy, etc. In the disperse systems. derived from overbased materials of this type the polar substituents in the third component are unchanged from their identity in the material which was originally overbased.

The identity of the third essential component of the disperse system depends upon the identity of the starting materials (i.e., the material to be overbased and the metal base compound) used in preparing the overbased material. Once the identity of these starting materials is known, the identity of the third component in the colloidal disperse system is automatically established. Thus, from the identity of the original material, the identity of the hydrophobic portion of the third component in the disperse system is readily established as being the residue of that material minus the polar substituents attached thereto. The identity of the polar substituents on the third component is established as a matter of chemistry. If the polar groups on the material to be overbased undergo reaction with the metal base, for example, if they are acid functions, hydroxy groups, etc., the polar substituent in the final product will correspond to the reaction product of the original substituent and the metal base. On the other hand, if the polar substituent in the material to be overbased is one which does not react with metal bases, then the polar substituent of the third component is the same as the original substituent.

As previously mentioned, this third component can orient itself around the metal-containing particles to form micellar colloidal particles. Accordingly, it can exist in the disperse system as an individual liquid component dissolved in the disperse medium or it can be associated with the metal-containing particles as a component of micellar colloidal particles.

The specifics on how to make a variety of metal overbased colloidal disperse systems from various metal overbased materials are known and disclosed in a number of U.S. patents. Examples 1–84 at column 18, line 37, to column 38, line 13, of U.S. Pat. No. 4,468,339, the description of which is hereby fully incorporated herein by reference, illustrate various overbased materials. Examples 1 through 43 are directed to the preparation of Newtonian overbased materials illustrative of the types which can be used as an additive to the non-Newtonian compositions of the present invention or to prepare the non-Newtonian colloidal disperse systems.

The change in Theological properties associated with conversion of a Newtonian overbased material into a non-Newtonian colloidal disperse system is demonstrated by the Brookfield Viscometer data derived from overbased materials and colloidal disperse systems prepared therefrom. Such data is disclosed in column 38, lines 13–63, of the above mentioned U.S. Pat. No. 4,468,339, and this disclosure is hereby fully incorporated herein by reference. This disclosure is reproduced in part below:

BROOKFIELD VISCOMETER DATA (Centipoises)

|       | Sample A |       | Sample B |        | Sample C |        | Sample D |       |
|-------|----------|-------|----------|--------|----------|--------|----------|-------|
| R.P.M.| (1)      | (2)   | (1)      | (2)    | (1)      | (2)    | (1)      | (2)   |
| 6     | 230      | 2,620 | 80       | 15,240 | 240      | 11,320 | 114      | 8,820 |
| 12    | 235      | 2,053 | 90       | 8,530  | 230      | 6,980  | 103      | 5,220 |
| 30    | 239      | *     | 88       | *      | 224      | 4,008  | 100      | 2,892 | n* Off scale

The samples each are identified by two numbers, (1) and (2). The first comprises the overbased material and the second comprises the colloidal disperse system. The overbased materials of the samples are further characterized as follows:

Sample A

Calcium overbased petrosulfonic acid having a metal ratio of about 12.2.

Sample B

Barium overbased oleic acid having a metal ratio of about 3.5

Sample C

Barium overbased petrosulfonic acid having a metal ratio of about 2.5.

Sample D

Calcium overbased commercial higher fatty acid mixture having a metal ratio of about 5.

The data of all samples is collected at 25° C.

By comparing column (1) with column (2) for each sample, it can be seen that the colloidal disperse system has a far greater viscosity than the overbased starting material.

The following are examples illustrating preparation of metal overbased colloidal disperse systems for use in the present invention. The term "neutralization base number" refers to a base number referenced against a phenolphthalein indicator.

Example (A-1)

A normal calcium mahogany sulfonate is prepared by metathesis of a 60% oil solution of sodium mahogany sulfonate (750 parts by weight) with a solution of 67 parts of calcium chloride and 63 parts of water. The reaction mass is heated for 4 hours at 90° to 100° C. to effect the conversion of the sodium mahogany sulfonate to calcium mahogany sulfonate. Then 54 parts of lime is added and the whole is heated to 150° C. over a period of 5 hours. When the whole has cooled to 40° C., 98 parts of methanol is added and 152 parts of carbon dioxide is introduced over a period of 20 hours at 42°–43° C. Water and alcohol are then removed by heating the mass to 150° C. The residue in the reaction vessel is diluted with 100 parts of low viscosity mineral oil. The filtered oil solution of the desired carbonated calcium sulfonate overbased material shows the following analysis: sulfate ash content, 16.4%; neutralization base number, 0.6 (acidic); and a metal ratio of 2.50. By adding barium or calcium oxide or hydroxide to this product with subsequent carbonation, the metal ratio can be increased to a ratio of 3.5 or greater as desired.

Example (A-2)

A mixture comprising 1,595 parts of the overbased material of Example A-1 (1.54 equivalents based on sulfonic acid anion), 167 parts of the calcium phenate prepared as indicated below (0.19 equivalent), 616 parts of mineral oil, 157 parts of 91% calcium hydroxide (3.86 equivalents), 288 parts of methanol, 88 parts of isobutanol, and 56 parts of mixed isomeric primaryamyl alcohols (containing about 65% normal amyl, 3% isoamyl and 32% of 2-methyl-1-butyl alcohols) is stirred vigorously at 40° C. and 25 parts of carbon dioxide is introduced over a period of 2 hours at 40°–50° C. Thereafter, three additional portions of calcium hydroxide, each amounting to 1.57 parts, are added and each such addition is followed by the introduction of carbon dioxide as previously illustrated. After the fourth calcium hydroxide addition and the carbonation step is completed, the reaction mass is carbonated for an additional hour at 43°–47° C. to reduce neutralization base number of the mass to 4.0. The substantially neutral, carbonated reaction mixture is freed from alcohol and any water of reaction by heating to 150° C. and simultaneously blowing it with nitrogen. The residue in the reaction vessel is filtered. The filtrate, an oil solution of the desired substantially neutral, carbonated calcium sulfonate overbased material of high metal ratio, shows the following analysis: sulfate ash content, 41.11%; neutralization number 0.9 (basic); and a metal ratio of 12.5.

The calcium phenate used above is prepared by adding 2,250 parts of mineral oil, 960 parts (5 moles) of heptylphenol, and 50 parts of water into a reaction vessel and stirring at 25° C. The mixture is heated to 40° C. and 7 parts of calcium hydroxide and 231 parts (7 moles) of 91% commercial paraformaldehyde is added over a period of 1 hour. The whole is heated to 80° C. and 200 additional parts of calcium hydroxide (making a total of 207 parts or 5 moles) is added over a period of 1 hour at 80°–90° C. The whole is heated to 150° C. and maintained at that temperature for 12 hours while nitrogen is blown through the mixture to assist in the removal of water. If foaming is encountered, a few drops of polymerized dimethyl silicone foam inhibitor may be added to control the foaming. The reaction mass is then filtered. The filtrate, a 33.6% oil solution of the desired calcium phenate of heptylphenol-formaldehyde condensation product is found to contain 7.56% sulfate ash.

Example (A-3)

A mixture of 1,000 parts of the product of Example A-2, 303 parts of mineral oil, 80 parts of methanol, 40 parts of mixed primary amyl alcohols (containing about 65% by weight of normal amyl alcohol, 3% by weight of isoamyl alcohol, and 32% by weight of 2-methyl-1-butyl alcohol) and 80 parts of water are introduced into a reaction vessel and heated to 70° C. and maintained at that temperature for 4.2 hours. The overbased material is converted to a gelatinous mass, the latter is stirred and heated at 150° C. for a period of about 2 hours to remove substantially all the alcohols and water. The residue is a dark green gel, which is a particularly useful colloidal disperse system.

Example (A-4)

A solution of 1,303 parts of the gel like colloidal disperse system of Example A-3 and 563 parts of mineral oil are dissolved in 1,303 parts of toluene by continuous agitation of these two components for about three hours. Added to this mixture is 40 parts of water and 40 parts of methanol followed by the slow addition of 471 parts of 91% calcium hydroxide with continuous stirring. An exothermic reaction takes place raising the temperature to 32° C. The entire reaction mass is then heated to about 60° C. over a 0.25 hour period. Two hundred-eighty parts of carbon dioxide is then charged over a five hour period while maintaining the temperature at 60°–70° C. At the conclusion of the carbonation, the mass is heated to about 150° C. over a 0.75 hour period to remove water, methanol, and toluene. The resulting product, a clear, light brown colloidal disperse system in the form of a gel has the following analysis: sulfate ash content, 46.8%; a neutralization base number, as measured against phenolphthalein, of less than 1.0; and a metal ratio of 36.0. In the above-described procedure, additional metal containing particles are incorporated into the colloidal disperse system of Example A-3 and its base neutralization number decreased to give a non-Newtonian colloidal disperse system useful in the invention of this application.

(B) The Water Soluble Associative Thickener

When component (C) the dispersant is added to component (A), the overbased non-Newtonian colloidal disperse system, and the resulting mixture diluted with water, the large particles within (A) settle out, i.e., phase separation occurs. It is only by incorporation of component (B), the associative thickener, that the large particles within (A) remain in suspension.

The water soluble associative thickener comprises a base-neutralized copolymer having copolymerized therein about 90 to about 99 mole percent of a carboxyl-containing, ethylenically unsaturated hydrocarbon and about 1 to about 10 mole percent of a nonionic surfactant acrylate having the formula:

wherein $R^1$ is hydrogen or methyl, $R^2$ is a hydrophobe selected from the group consisting of alkyl and

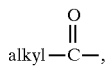

wherein the alkyl contains 4 to 30 carbon atoms, Z is a divalent radical selected from the group consisting of oxyethylene units or mixed oxyalkylene units having the general formula:

where n is an integer having values from 2 to 4 and x is an integer having values of about 5 to 40.

The preferred carboxyl-containing ethylenically unsaturated hydrocarbon is acrylic acid. One may also use methacrylic acid, maleic acid, fumaric acid, itaconic acid, and the like, if desired.

Although about 90 to about 99 mole percent of carboxyl-containing ethylenically unsaturated hydrocarbon can be present in the copolymer of this invention, it is preferred to incorporate about 96 to about 99 mole percent in the copolymer.

The nonionic surfactant acrylate used to make the copolymer can be prepared by known methods of acrylation with acrylic acid of a hydroxylterminated compound consisting of a hydrophobe and hydrophile moiety. This hydroxyl terminated compound is prepared by forming an alkylene oxide adduct of a fatty acid or a primary or secondary saturated aliphatic alcohol. The hydrophobe moiety obtained thereby contains about 4 to 30 carbon atoms, preferably about 11 to 30 carbon atoms and even more preferably about 15 to 30 carbon atoms. The hydrophile moiety can contain at least 5 oxyethylene units when the alkylene oxide used is ethylene oxide and preferably at least 7 moles of oxyethylene units or in the case of an alkylene oxide mixture of ethylene oxide and propylene oxide, at least 7 mixed oxyalkylene units and preferably at least 9 mixed oxyalkylene units.

The acylation can be effected by such well known reactions as the Schotten-Baumann method, and the like.

The preparation of non-ionic surfactants is described in Nonionic Surfactants, Vol. 1, editor M. J. Schick, Marcel Dekker, Inc., New York City, 1967. The preparation of acrylate esters of nonionic surfactants is also well known in the art and general preparations are disclosed in U.S. Pat. Nos. 3,341,627 and 3,896,161.

In the case of mixed alkylene oxide adducts the copolymers can be prepared with blocks of ethoxy units followed by propoxy units, propoxy units followed by ethoxy units or a random mixture of both.

The copolymers are preferably made by polymerizing the comonomers in an inert diluent having solubilizing character on the monomer ingredients but substantially none on the, resultant copolymer. Suitable diluents include aromatic solvents such as benzene, toluene, xylene, tetralin, and the like, as well as saturated aliphatic solvents including hexane, heptane, octane, and the like, and saturated cycloaliphatic compounds, such as cyclopentane, cyclohexane, cycloheptane, and the like. Halogenated solvents can also be used, such as, carbon tetrachloride, bromotrichloromethane, trichlorofluoromethane, tetrafluoromethane, 1,1,2-trichloro-1,2,2-trifluoromethane, 1,2-difluoro-1,1,2,2-tetrachloroethane, tri-chloroethane, perchloroethylene, and the like.

Polymerization of the monomers in the diluent is carried out in the presence of a solvent-soluble free radical catalyst in an inert atmosphere in a closed vessel. The temperature of polymerization may be varied from room temperature to about 150° C. depending upon the diluent and free radical catalyst employed. Polymerization of comonomers in an open vessel under reflux and under an inert atmosphere is also suitable. The temperature of polymerization under these conditions depends upon the boiling point of the inert diluent used. The polymerizations proceed to yield 90 to 100 percent copolymer upon reaction at 60° to 110° for 6 hours or longer.

Suitable solvent-soluble free radical catalyst include benzoyl peroxide, hydrogen peroxide, caprylyl peroxide, cumene hydroperoxide, tertiary butyl perbenzoate, azobisisobutyronitrile, and the like.

Inasmuch as the copolymers thus prepared in the diluent enumerated above which are solvents for the comonomers and non-solvents for the copolymers the product precipitates from the reaction mixture as a fine powder. Removal of the diluent by filtration and decantation or vacuum stripping yields a fine, white, powdery copolymer.

Alternative methods of polymerization including inert emulsion polymerization in hydrocarbon solvents and emulsion polymerization in aqueous salt solution can be used but are more difficult to control and some cases require a monomer feed sequence reaction as opposed to simple monomer batch charge.

Optimum aqueous thickening is obtained with copolymers composed of acrylic acid and from about 1 to about 4 mole percent of a nonionic surfactant acrylate. The hydrophile portion of the surfactant thus described contains about 20 to about 40 moles and preferably about 30 to 40 moles of ethylene-oxide. The hydrophobe portion of the surfactant acrylate in the above example is composed of a monohydric hydrocarbon alcohol or acid having at least 11 carbon atoms and preferably at least 15 carbon atoms contained therein. The chemical nature of the hydrophobe, that is, primary or secondary alcohol or fatty acid, exerts less influence on the copolymer's aqueous thickening efficiency than its molecular weight, i.e., total number of carbon atoms in the copolymer.

An especially preferred associative thickener is an acrylic latex polymer available from Union Carbide and identified as UCAR® Polyphobe 9823.

The associative thickeners (B) are further described in the examples which follow. All parts and percentages are by weight unless otherwise specified.

Example (B-1)

PREPARATION OF NONIONIC SURFACTANT ACRYLATES

The Schotten-Baumann method was used for preparing a series of nonionic surfactant acrylates as follows:

A mole equivalent of a nonionic surfactant was dissolved in five times its weight of toluene contained in a four-necked-round bottomed flask equipped with a condenser, thermometer, dropping funnel, mechanical stirrer, nitrogen inlet tube and Glas-col heating mantle. The nonionic surfactants used in the preparation of the surfactant acrylates included linear primary alcoholethoxylates, linear primary alcohol ethoxylates-proproxylates, and secondary alcohol ethoxylates. A mole equivalent of triethylamine was added to the stirred solution. A mole equivalent of acryloyl chloride dissolved in a equal weight of toluene was added to the solution portion wise. The reaction was allowed to proceed at reflux temperature for 4 hours. The reaction mixture was then cooled to room temperature and the amine hydrochloride which formed was removed by suction filtration. The toluene was removed from the filtrate in vacuo to yield the nonionic surfactant acrylate. Identification of specific commercially available surfactants together with the number of ethoxy and/or propoxy units and molecular weights are given in Table 1.

Example (B-2)

PREPARATION OF THE ASSOCIATIVE THICKENERS

A series of batch polymerizations of acrylic acid and the acrylic acid ester of TERGITOL 15-S-40 was carried out in benzene at 60° C. using azobisisobutronitrile as the polymerization initiator. The polymerizations were carried out in 16-ounce capped glass bottles and in an inert atmosphere of nitrogen. The resultant polymers, insoluble in the benzene diluent, were collected by suction filtration, washed, and dried in an oven at 60° C. Aqueous solutions of the resultant polymers were prepared by neutralizing 2.0 grams of said polymers contained in 396.5 grams of distilled water with 1.5 grams of ammonium hydroxide. Water-Varsol (Trademark for a hydrocarbon solvent sold by Exxon Corporation having a boiling range of 315° to 380° F. and consisting mainly of saturated and aromatic distillation fractions) emulsions of the resultant copolymers were prepared by neutralizing 1.0 grams of the copolymer contained in 120.0 grams of distilled water, 75.0 grams of Varsol, 2.5 grams of the surfactant TERGITOL 15-S-9 with 1.5 grams of ammonium hydroxide.

Table 2 delineates the viscosity data of 0.5 weight percent solutions of six acrylic acid-TERGITOL-S-40 acrylate copolymers containing 0.90 to 3.5 mole percent TERGITOL 15-S-40 acrylate copolymerized therein. The surfactant acrylate content is indicated as mole percent of monomer charge. These data indicate that a maximum aqueous and emulsion viscosity is obtained at 2.0-3.0 mole percent surfactant acrylate. The water-Varsol emulsion viscosities are considerably greater than the corresponding aqueous viscosities.

TABLE I

| Nonionic Surfactants | | | |
|---|---|---|---|
| SURFACTANT | EO(a) | PO(b) | Mol. Wt.(d) |
| TERGITOL 15-S-40(e) | 40 | — | 1962 |
| TERGITOL 15-2-12(e) | 12 | — | 788 |
| NEODOL 25-12(f) | 12 | — | 734 |
| EPAL(g) 1214-7, 1 | 7 | — | 516 |
| EPAL(h) 1214-8, 1.5 | 8 | 1.5 | 634 |
| EPAL(i) 1418-6, 4.5 | 6 | 4.5 | 767 |
| UCON(j) 80 HB-192 | 11 | 2 | 685 |
| UCON(k) 50 HB-5100 | 47 | 35 | 4100 |

(a)Moles of ethylene oxide adducted per mole of alcohol.
(b)Moles of propylene oxide adducted per mole of alcohol.
(d)Weight average molecular weight.
(e)Trademark for an ethylene oxide adduct of a mixture of C12 to C15 isomeric linear alcohols sold by Union Carbide Corp.
(f)Trademark for an ethylene oxide adduct of a mixture of C12 to C15 isomeric linear alcohols sold by Shell.
(g)Trademark of Ethyl Corp. for a linear primary alcohol mixture having a molecular weight of 200 and 12 to 14 carbon atoms which were ethoxylated with 7 moles of ethylene oxide per mole of Epal 1214.
(h)Trademark of Ethyl Corp. for a linear primary alcohol having 12 to 14 carbon atoms which were alkoxylated with 8 moles of ethylene oxide and 1.5 moles of propylene oxide per mole of Epal 1214.
(i)Trademark of Ethyl Corp. for a linear primary alcohol having 14 to 18 atoms which were alkoxylated with 6 moles of ethylene oxide and 4.5 moles of propylene oxide per mole of Epal 1418.
(j)UCON 80 HB-192 is a Trademark of Union Carbide Corp. for butanol alkoxylated with 11 moles of ethylene oxide and 2 moles of propylene oxide.
(k)UCON 50 HB-5100 is a Trademark of Union Carbide Corp. for butanol alkoyxlated with 47 moles of ethylene oxide and 35 moles of propylene oxide.

TABLE II

| Aqueous and Emulsion Viscosities of Acrylic Acid-TERGITOL 15-S-40 Acrylate Copolymers | | | |
|---|---|---|---|
| Mole % TERGITOL 15-S-40 | | Viscosities (cps) of 0.5% Polymer | |
| Copolymer | Acrylate | In Water | Water-Varsol |
| 1 | 0.90 | 7,000 | 39,400 |
| 2 | 1.35 | 10,400 | 37,200 |
| 3 | 2.0 | 22,800 | 80,000 |
| 4 | 2.5 | 26,000 | 46,000 |
| 5 | 3.0 | 21,650 | 72,000 |
| 6 | 3.5 | 15,600 | 56,000 |

Example 3

Employing the procedures of Example 2, a series of acrylic acid-TERGITOL15-S-12 acrylate copolymers was made and evaluated with the results depicted in Table III. The aqueous and water-Varsol emulsion viscosities of the polymers increase with increasing TERGITOL 15-S-12 acrylate. The emulsion viscosities are greater than the corresponding aqueous viscosities.

TABLE III

Aqueous and Emulsion Viscosities of
Acrylic Acid-TERGITOL 15-S-12 Acrylate Copolymers

| Polymer | Mole % TERGITOL 15-S-12 Acrylate | Viscosities (cps) of 0.5% Polymer Aqueous | Water-Varsol |
|---|---|---|---|
| 1 | 1.5 | 1400 | 22400 |
| 2 | 2.0 | 2750 | 45600 |
| 3 | 2.5 | 4500 | 56000 |
| 4 | 3.0 | 7000 | 70800 |
| 5 | 3.5 | 9000 | 81000 |
| 6 | 4.0 | 10400 | 78400 |

Example 4

Using the procedures of Example 2, a series of acrylic acid-NEODOL 25-12 acrylate copolymers was made and evaluated with the results shown in Table IV. The aqueous and emulsion viscosities increase with increasing NEODOL 25-12 acrylate mole percent monomer charge. The emulsion viscosities are considerably greater than the corresponding aqueous viscosities.

TABLE IV

Aqueous and Emulsion Viscosities of
Acrylic Acid-NEODOL 25-12 Acrylate Copolymer

| Polymer | Mole % NEODOL 25-12 Acrylate | Viscosities (cps) of 0.5% Polymer Aqueous | Water-Varsol |
|---|---|---|---|
| 1 | 1.5 | 1276 | 54400 |
| 2 | 2.0 | 2175 | 83400 |
| 3 | 2.5 | 2990 | 104600 |
| 4 | 3.0 | 4085 | 93400 |
| 5 | 3.5 | 4240 | 97000 |
| 6 | 4.0 | 5340 | 97400 |

(C) The Dispersant

Within the instant invention, two different types of dispersants are envisioned. Component (C), the dispersant, emulsifies the oil present within component (A) and disperses the smaller colloidal particles within (A). They thus also serve to stabilize the dispersions formed. The first dispersant (C1) is an alkylene oxide/hydrocarbyl amine condensate wherein the amine has at least about 12 carbon atoms.

The useful (C1) dispersants are alkylene oxide condensates (i.e., alkoxylates) with active hydrogen compounds such as alcohols, phenols, amides and amines. The amides are often fatty acid amides such as oleyl amides. A particularly useful class of dispersants are the ethoxylated amines wherein the amine has at least 12 carbon atoms. Such cationic dispersants can be represented by the general formulae:

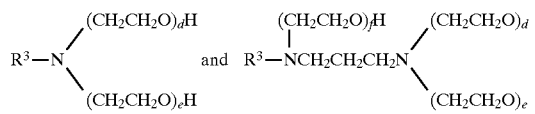

wherein $R^3$ is an aliphatic hydrocarbyl group with at least about 12 carbon atoms, d, e and f are integers of zero to 40 and the sum d +e is between two and 50. Usually the aliphatic group $R^3$ has a maximum of about 22 carbons. Often such R groups are fatty alkyl or alkenyl groups such as coco ($C_{12}$), stearyl ($C_{18}$), tallow ($C_{18}$), oleyl ($C_{18}$), and the like. Typically $R^3$ is a tallow residue and the sum d+e is between 3 and 10. Homologous alkoxylated amines wherein the ethoxyl residue (—$CH_2CH_2O$—) is replaced, at least in part, by a propoxyl residue

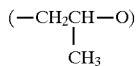

are also useful. Mixtures of one or more of the aforedescribed dispersants can be used.

A number of useful dispersants of the alkoxylated type are sold by the Armak Company under the tradename Etho-Chemicals. These include Ethofats, Ethomeens, Ethoduomeens, Ethomids and Ethoquads.

The second dispersant (C2) is a nitrogen-containing phosphorus-free carboxylic acid derivative made by reacting a mixture comprising (a) at least one carboxylic acid acrylating agent, said acylating agent having at least one hydrocarbyl-based substituent of about 20 to about 500 carbon atoms, and (b) at least one alkanol tertiary monoamine, said monoamine having one hydroxyl group and a total of up to about 40 carbon atoms.

The acylating agents used in making the dispersant (C2) are well known to those of skill in the art and have been found to be useful as additives for lubricants and fuels and as intermediates for preparing the same See, for example, the following U.S. Pat. Nos. which are hereby incorporated by reference for their disclosures relating to the preparation of carboxylic acid acylating agents: 3,219,666; 3,272,746; 3,381,102; 3,254,025; 3,278,550; 3,288,714; 3,271,310; 3,373,111; 3,346,354; 3,272,743; 3,374,174; 3,307,928; and 3,394,179.

Generally, these carboxylic acid acylating agents are prepared by reacting an olefin polymer or chlorinated analog thereof with an unsaturated carboxylic acid or derivative thereof such as acrylic acid, fumaric acid, maleic anhydride and the like. Typically, these acylating agents are polycarboxylic acylating agents such as the succinic acid acylating agents derived from maleic acid, its isomers, anhydride and chloro and bromo derivatives.

These acylating agents have at least one hydrocarbyl-based substituent of about 20 to about 500 carbon atoms Generally, this substituent has an average of at least about 30, and often at least about 50 carbon atoms. Typically, this substituent has a maximum average of about 300, and often about 200 carbon atoms. As used herein, the term "hydrocarbon-based", "hydrocarbon-based substituent" and the like denotes the substituent having a carbon atom directly attached to the remainder of the molecule (i.e., the carboxylic acylating portion) and having predominantly hydrocarbyl character within the context of this invention. Such substituents include the following:

(1) hydrocarbon substituents, that is, aliphatic (e.g., alkyl or alkenyl), alicyclic (e.g., cycloalkyl, cycloalkenyl) substituents, aromatic, aliphatic and alicyclic-substituted aromatic nuclei and the liked as well as cyclic substituents wherein the ring is completed through another portion of the molecule (that is, for example, any two indicated substituents may together form an alicyclic radical);

(2) substituted hydrocarbon substituents, that is, those substituents containing non-hydrocarbon radicals which, in the context of this invention, do not alter the predominantly hydrocarbyl substituent; those skilled in the art will be aware of such radicals (e.g., halo (especially chloro and fluoro), alkoxy, mercapto, alkylmercapto, nitro, nitroso, sulfoxy, etc.);

(3) hetero substituents, that is, substituents which will, while having predominantly hydrocarbyl character within the context of this invention, contain other than carbon present in a ring or chain otherwise composed of carbon atoms. Suitable heteroatoms will be apparent to those of skill in the art and include, for: example, sulfur, oxygen, nitrogen and such substituents as e.g., pyridyl, furanyl, thiophenyl, imidazolyl, etc., are exemplary of these hetero substituents.

In general, no more than about three radicals or heteroatoms and preferably no more than one, will be present for each ten carbon atoms in the hydrocarbon-based substituents. Typically, there will be no such radicals or heteroatoms in the hydrocarbon-based substituent and it will, therefore, be purely hydrocarbyl.

In general, the hydrocarbon-based substituents of at least about 20 carbon atoms present in the acylating agents used in this invention are free from acetylenic unsaturation; ethylenic unsaturation, when present will generally be such that there is no more than one ethylenic linkage present for every ten carbon-to-carbon bonds in the substituent. The substituents are often completely saturated and therefore contain no ethylenic unsaturation.

As noted above, the hydrocarbon-based substituents present in the acylating agents are derived from olefin polymers or chlorinated analogs thereof The olefin monomers from which the olefin polymers are derived are polymerizable olefins and monomers characterized by having one or more ethylenic unsaturated group. They can be monoolefinic monomers such as ethylene, propylene, butene-1, isobutene and octene-1 or polyolefinic monomers (usually di-olefinic monomers such as butadiene-1,3 and isoprene). Usually these monomers are terminal olefins, that is, olefins characterized by the presence of the group

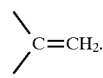

However, certain internal olefins can also serve as monomers (these are sometimes referred to as medial olefins). When such medial olefin monomers are used, they normally are employed, in combination with terminal olefins to produce olefin polymers which are interpolymers. Although the hydrocarbyl-based substituents may also include aromatic groups (especially phenyl groups and lower alkyl and/or lower alkoxy-substituted phenyl group such as para(tertiary butyl)phenyl groups) and alicyclic groups such as would be obtained from polymerizable cyclic olefins or alicyclic-substituted polymerizable cyclic olefins. The olefin polymers are usually free from such groups. Nevertheless, olefin polymers derived from such interpolymers of both 1,3-dienes and styrenes such as butadiene-1,3 and styrene or para(tertiary butyl)styrene are exceptions to this general rule.

Generally the olefin polymers are homo- or interpolymers of terminal hydrocarbyl olefins of about 2 to about 16 carbon atoms. A more typical class of olefin polymers is selected from that group consisting of homo- and interpolymers of terminal olefins of two to six carbon atoms, especially those of two to four carbon atoms.

Specific examples of terminal and medial olefin monomers which can be used to prepare the olefin polymers from which the hydrocarbon-based substituents in the acylating agents used in this invention are ethylene, propylene, butene-1, butene-2, isobutene, pentene-1, hexene-1, heptene-1, octene-1, nonene-1, decene-1, pentene-2, propylene tetramer, diisobutylene, isobutylene trimer, butadiene-1,2, butadiene-1,3, pentadiene-1,2, pentadiene-1,3, isoprene, hexadiene-1,5, 2-chloro-butadiene-1,3, 2-methylheptene-1, 3-cyclohexylbutene-1, 3,3-dimethylpentene-1, styrenedivinylbenzene, vinylacetate allyl alcohol, 1-methylvinylacetate, acrylo-nitrile, ethylacrylate, ethylvinylether and methylvinylketone Of these, the purely hydrocarbyl monomers are more typical and the terminal olefin monomers are especially typical.

Often the olefin polymers are poly(isobutene)s such as obtained by polymerization of a $C_4$ refinery stream having a butene content of about 35 to about 75 percent by weight and an isobutene content of about 30 to about 60 percent by weight in the presence of a Lewis acid catalyst such as aluminum chloride or boron trifluoride. These poly (isobutene)s contain predominantly (that is, greater than 80% of the total repeat units) isobutene repeat units of the configuration

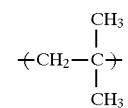

Typically, the hydrocarbyl-based substituent in the carboxylic acid acylating agent is a hydrocarbyl, alkyl or alkenyl group of about 20, often about 50, to about 500, sometimes about 300, carbon atoms. For convenience herein, such substituents are represented as "$R^4$".

As noted above, typical acylating agents (a) are substituted succinic acids or derivatives thereof. In this case, the acylating agent (a) can be represented by the formulae:

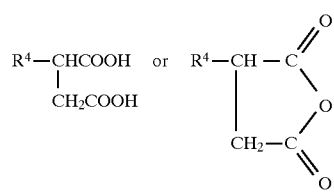

Such succinic acid acylating agents can be made by the reaction of maleic anhydride, maleic acid, or fumaric acid with the aforedescribed olefin polymer, as is shown in the patents referred to above. Generally, the reaction involves merely heating the two reactants at a temperature of about 150° to about 200°. Mixtures of these polymeric olefins, as well as mixtures of these unsaturated mono- and polycarboxylic acids can also be used.

The amines are alkanol tertiary monoamines having one hydroxyl group per molecular and normally up to about 40 carbon atoms. These hydroxyl groups are bonded to an alkyl group which in turn is bonded to the amine portion of the molecule. The two remaining substituents bonded to the tertiary amine nitrogen are hydrocarbyl groups each having one to about 20 carbon atoms. Usually they will also be alkyl groups, but they can be alkenyl groups with one olefinic bond. Typically they are lower alkyl groups of up to seven carbons, though they can also be aryl, aralkyl, alkaryl, cycloalkyl, alkyl cycloalkyl, and cycloalkylalkyl groups. Mixtures of two or more of the amines (b) can also be used.

A typical class of useful amines can be represented by the formula

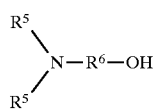

wherein each $R^5$ is independently a hydrocarbyl group of one to about eighteen carbon atoms and R is a straight or branched chain alkylene group of about two to about eighteen carbon atoms. The N/N-dialkyl-alkanol amines within the above formula are particularly preferred, especially those wherein each $R^5$ is independently a lower alkyl and $R^6$ is lower alkylene. The two $R^5$ groups can be joined by a carbon-to-carbon bond or a heteroatom (e.g., —O— or —S—) to form a 5- or 6-membered heterocyclic ring.

Specific examples of useful alkanol amines (b) include N,N-diethyl ethanol amine, N-methyl, N-phenyl-2-hydroxy propyl amines, N,N-dimethyl-2- hydroxybutyl amine, N,N-diethyl-2-hydroxy octadecyl amine, N-(2-hydroxy ethyl) morpholine, -methyl(2-hydroxy ethyl)cyclohexylamine.

The reaction of the acylating agent with the alkanol amine can be carried out at a temperature ranging from about 30° to the decomposition temperature of one or more of the reaction components and/or products. Typically, it is carried out at a temperature in the range of about 50° to about 150°. Often the reaction is carried out under ester-forming conditions and the product thus formed is an ester or an ester/salt. This salt can be an internal salt involving residues of a molecule of acylating agent and of amine, wherein one of the carboxyl groups becomes ionically bound to a nitrogen atom within the same group or it may be an external salt wherein the ionic salt group is formed with a nitrogen atom which is not part of the same molecule.

Mixtures of acylating agents and/or mixtures of alkanol amines can be used. Generally, the equivalent ratio of acylating agent to alkanol amine formed is in the range of about 0.5 to about 3 equivalents of amine per equivalent of carboxylic asylating agent. An equivalent of carboxylic acylating agent can be determined by dividing the molecular weight of the acylating agent by the number of carboxyl functions. This can usually be determined from the structural formula of the acylating agent or empirically through well-known titration procedures. Thus a succinic anhydride has an equivalent weight of half its molecular weight. An equivalent of alkanol amine is equal to its molecular weight. Typically, equivalent ratios of acylating agent to amine is in the range of about 1:1 to about 1:2.5.

Usually the acylating agent and amine are reacted at a temperature below about 100° C., often in the absence of additional solvent/diluents.

The following are specific examples of the preparation of nitrogen-containing, phosphorus-free carboxylic acid derivatives (C2). In these examples all parts and percentages are by weight unless expressly stated to the contrary and all temperatures are in degrees Celsius, as is the case throughout the specification and appended claims.

Example (C2-1)

To a charge of 2240 parts of a poly(isobutene)-substituted succinic anhydride (having a molecular weight of 1120) heated in a resin kettle with stirring to about 90° is slowly added over a two-hour period 468 parts of diethyl ethanol amine. Heating is continued for an additional hour at about 90°. The desired reaction product is a viscous, clear, brown-tinted liquid at room temperature.

Example (C2-2)

To a charge of 6720 parts of the succinic anhydride described in Example (C2-1), heated to 90° with stirring, is slowly added over 1.5 hours, 702 parts of diethyl ethanol amine. This intermediate mixture is then heated for an additional 0.5 hour at 90°. Then 366 parts of monoethanol amine is slowly added. The mixture is then held at 90° for a final 0.5 hour and cooled to provide a clear brown, viscous liquid product.

(D) Weighting Agents

Weighting agents increase density of drilling muds and include galena (PbS), hematite ($Fe_2O_3$), magnetite ($Fe_3O_4$), ilmenite ($FeTiO_3$), barite ($BaSO_4$), siderite ($FeCO_3$), celestite ($SrSO_4$), dolomite ($CaMg(CO_3)2$), and calcite ($CaCO_3$). Particularly useful weighting agents include barium sulfate and iron oxide. Weighting agents may also be soluble salts such as sodium chloride, sodium bromide, sodium carbonate, potassium chloride, potassium carbonate, calcium bromide, zinc chloride, and zinc bromide. The weighting agents may be present in an amount from about 20, or about, 100, or about 250, to about 900, or to about 700, or to about 600. In one embodiment, the weighting agent is present in an amount from about 300 to about 500 or about 400 pounds per barrel (PPB).

(E)Clays

The compositions may also contain commercial clays such as bentonite, attapulgite, sepiolite, montmorillonite, hectorite, saponite, and illite. Montmorillonite, bentonite and attapulgite are preferred, with mortmorillonite more preferred. These clays are ordinary water wetable clays and are not treated to covert them into organophilic clays. The clays may be present in an amount from about 1, or about 2 up to about 10, or to about 8 pounds per barrel (PPB).

The following states the ranges of components (A) to (C) in parts by weight

| Component | Generally | Preferred | Most Preferred |
|-----------|-----------|-----------|----------------|
| (A) | 20–80 | 30–70 | 40–70 |
| (B) | 2–20 | 2–15 | 2–10 |
| (C) | 10–40 | 10–30 | 10–20 |

It is understood that other components besides (A), (B) and (C) may be present within the composition of this invention.

Water is present in the composition in an amount of about 10 to 95 parts by weight and the (A), (B) and (C) components are present in the suspension in an amount of from about 5 to about 90 parts by weight, wherein the total parts by weight of water, and components (A), (13) and (C) is 100 parts.

The components of this invention are blended together according to the above ranges to effect suspension. Example 1 below is a concentrate containing the (A), (B) and (C) components.

Example 1

Added to a mixing vessel are 110.91 parts of Example (A-4); 48 parts of UCAR 9823 as component (B); 22.85 parts of an ethoxylated tallow amine containing approximately five ethylene oxide derived units as component (C1); this ethoxylated tallow amine is sold by the Armak Corporation under the tradename Ethomeen T/15; 23.32 parts of Example (C2-2) and 718 parts water. The contents are mixed until a suspension is formed.

Example 2 below is a concentrate containing only the (A) and (C) components and water and is prepared as a comparison to Example 1.

Example 2

The exact procedure of Example 1 is repeated except that component (B) is eliminated.

A baseline drilling fluid is prepared by slowly introducing 8.13 parts bentonite clay into 78.4 parts of tap water with moderate shear using a Hamilton Beach type mixer. The bentonite clay is allowed to hydrate for 16 hours.

To the prehydrated bentonite clay is added 0.91 parts of ferrochrome lignosulfate, 0.11 parts caustic soda (NaOH) and 13.49 parts rev dust (calcium morillontic clay) with moderate shear, until uniform.

A seawater solution is prepared by dissolving in one liter of tap water 43 grams of Instant Ocean® which is a mixture of various salts but predominantly sodium chloride. The Instant Ocean® is available from Aquarium Systems, Mentor, Ohio. To 272 parts of this seawater solution is added 4.08 parts sodium chloride to form a saltwater solution.

To this saltwater solution, the above mixture consisting of: hydrated bentonite clay, ferrochrome lignosulfonate, caustic soda, and rev dust, is added. The mixture was mixed with moderate shear on a Hamilton Beach type mixer for a period of 5 minutes. A coefficient of friction value is generated for this baseline drilling fluid as summarized in Table IV.

Examples 1A and 2A contain the base drilling fluid and 4 PPB of Examples 1 and 2, respectively. Coefficient of friction values are generated for Examples 1A and 2A and a percent reduction of coefficient of friction is determined. Table IV summarizes these results.

TABLE IV

| Example | Coefficient of Friction | Percent Reduction |
|---|---|---|
| Baseline | 0.1542 | — |
| 1A | 0.1121 | 27.3 |
| 2A | 0.1182 | 23.35 |

The main thrust of this inventon is with respect to storage stability. Many drilling fluids, in storage, manage to separate. As in the instant invention, this is due to the presence of the large micellar colloidal particles of the disperse system component (A). In the presence of water, these large micellar colloidal particles tend to separate out and the effectiveness of the drilling fluids is decreased. Examples 3 and 4 are prepared to illustrate this storage stability as summarized in Table V.

Example 3

A fluid is prepared by combining 40 parts of tap water and 40 parts of the material from Example 1.

Example 4

A fluid is prepared by combining 40 parts of tap water and 40 parts of the material from Example 2.

TABLE V

Storage Stability after Seven Days

| Example | Separation |
|---|---|
| 3 | 0.3 cm |
| 4 | 1.1 cm |

The present invention is also directed to a method to prevent settling and improve lubricity in water-based drilling fluids comprising the steps of: introducing into a well borehole an oil in water dispersion composition comprising a mixture of water, and (A) an overbased non-Newtonian colloidal disperse system comprising (1) solid metal-containing colloidal particles predispersed in (2) a disperse medium of at least one inert organic liquid and (3) at least one member selected from the class consisting of organic compounds which are substantially soluble in the disperse medium, where the molecules of said organic compound have polar substituents and hydrophobic portions;

(B) a water soluble associative thickener comprising a base-neutralized copolymer having copolymerized therein about 90 to about 99 mole percent of a carboxyl-containing, ethylenically unsaturated hydrocarbon and about 1 to about 10 mole percent of a nonionic surfactant acrylate having the formula:

$$R^2\text{---}(Z)_x\text{---}OCCR^1=CH_2$$
$$\phantom{R^2\text{---}(Z)_x\text{---}O}\|\phantom{CCR^1=CH_2}$$
$$\phantom{R^2\text{---}(Z)_x\text{---}OC}O$$

wherein $R^1$ is hydrogen or methyl, R2 is a hydrophobe selected from the group consisting of alkyl and alkyl $$\text{alkyl-C---}$$
$$\phantom{\text{alkyl-}}\|$$
$$\phantom{\text{alkyl-C}}O$$

wherein the alkyl contains 4 to 30 carbon atoms, Z is a divalent radical selected from the group consisting of oxyethylene units or mixed oxyalkylene units having the general formula $$\text{---}(OC_nH_{2n})\text{---}$$

wherein n is an integer having values from 2 to 4 and x is an integer having values of about 5 to 40;

(C) at least one dispersant; and drilling the well borehole.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. An oil in water dispersion emulsion composition, comprising a mixture of water and (A) an overbased non-Newtonian colloidal disperse system comprising (1) solid metal-containing colloidal particles predispersed in (2) a disperse medium of at least one inert organic liquid and (3) at least one member selected from the class consisting of organic compounds which are substantially soluble in the disperse medium, where the molecules of said organic compound have polar substituents and hydrophobic portions;

(B) a water soluble associative thickener comprising a base-neutralized copolymer having copolymerized therein about 90 to about 99 mole percent of a carboxyl-containing, ethylenically unsaturated hydrocarbon and about 1 to about 10 mole percent of a nonionic surfactant acrylate having the formula:

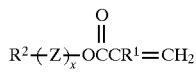

wherein R is hydrogen or methyl, $R^2$ is a hydrophobe selected from the group consisting of alkyl and

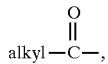

wherein the alkyl contains 4 to 30 carbon atoms, Z is a divalent radical selected from the group consisting of oxyethylene units or mixed oxyalkylene units having the general formula:

where n is an integer having values from 2 to 4 and x is an integer having values of about 5 to 40; and (C) at least one dispersant.

2. The composition of claim 1 wherein the solid metal-containing colloidal particles (1) of said system are formed in situ in said disperse system from metal-containing materials homogeneously dispersed in a single phase Newtonian overbased material having a metal ratio of at least 1.1.

3. The composition of claim 1 wherein the solid metal-containing colloidal particles (1) comprise alkali metal salts.

4. The composition of claim 3 wherein the alkali metal salt is selected from the group consisting of sodium and lithium.

5. The composition of claim 1 wherein the solid metal-containing colloidal particles (1) comprise at least one alkaline earth metal salt.

6. The composition of claim 5 wherein the alkaline earth metal salt is selected from the group consisting of calcium, magnesium, and barium salts and mixtures thereof.

7. The composition of claim 1 wherein the solid metal-containing colloidal particles (1) are selected from the group consisting of alkali or alkaline earth metal acetates, formates, carbonates, sulfides, sulfites, thiosulfides, and halides.

8. The composition of claim 7 wherein the solid metal-containing colloidal particles (1) are selected from the group consisting of calcium, sodium, lithium and barium carbonates and calcium, sodium, lithium and barium acetates.

9. The composition of claim 1 wherein the disperse medium (2) comprises mineral oil and at least one other organic liquid miscible with mineral oil.

10. The composition of claim 1 wherein (3) comprises at least one alkali or alkaline earth metal salt of a petrosulfonic acid, a mono-, di-, and trialiphatic hydrocarbon substituted aryl sulfonic acid, or a carboxylic acid.

11. The composition of claim 10 wherein the carboxylic acid comprises at least one linear unsaturated hydrocarbon group containing from about 8 to about 30 carbon atoms.

12. The composition of claim 11 wherein the hydrocarbon group contains from 16 to 22 carbon atoms.

13. The composition of claim 11 wherein the carboxylic acid comprises at least one carboxyl group substituted on a terminal carbon atom of the unsaturated hydrocarbon group.

14. The composition of claim 10 wherein the carboxylic acid comprises a monocarboxylic acid.

15. The composition of claim 10 wherein the carboxylic acid is selected from the group consisting of tall oil fatty acids, linoleic acid, abietic acid, linolenic acid, palmitoleic acid, oleic acid and ricinoleic acid.

16. The composition of claim 10 wherein the solid metal-containing particles are selected from the group consisting of alkali and alkaline earth metal carbonates and bicarbonates, or mixtures thereof, which are present in an amount of from about 4.0 equivalents to about 40 equivalents of alkali metal or alkaline earth metal in the colloidal particles per equivalent of carboxylic acid present in (3).

17. The composition of claim 1 wherein within (B) $R^1$ is hydrogen.

18. The composition of claim 1 wherein within (B) $R^2$ is alkyl.

19. The composition of claim 1 wherein within (B) Z is an oxyethylene group.

20. The composition of claim 1 wherein within (B) Z is mixed oxyalkylene groups.

21. The composition of claim 1 wherein x is 8 to 12.

22. The composition of claim 1 wherein the dispersant (C) comprises (1) an alkylene oxide/hydrocarbyl amine condensate wherein the amine has at least about 12 carbon atoms, or (2) a nitrogen-containing phosphorus-free carboxylic acid derivative made by reacting a mixture comprising
  (a) at least one carboxylic acid acylating agent, said acylating agent having at least one hydrocarbyl-based substituent of about 20 to about 500 carbon atoms, and
  (b) at least one alkanol tertiary monoamine, said monoamine having one hydroxyl group and a total of up to about 40 carbon atoms.

23. The composition of claim 22 wherein within (C1) the condensate is represented by the formula

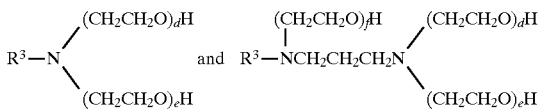

wherein $R^3$ is an aliphatic hydrocarbyl group containing from 12 to 22 carbon atoms; d, e and f are integers of zero to 40 and the sum of d+e is between 2 and 50.

24. The composition of claim 23 wherein $R^3$ is a tallow residue and the sum of d+e averages between about 3 and about 10.

25. The composition of claim 22 wherein within (C2), the acylating agent is represented by the formula

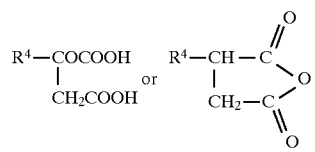

wherein $R^4$ is a hydrocarbyl group containing from about 20 to about 500 carbon atoms.

26. The composition of claim 25 wherein the hydrocarbyl group is a 2 polyisobutene group.

27. The composition of claim 25 wherein the hydrocarbyl group is an alkyl or 2 alkylene group.

28. The composition of claim 25 wherein within (C2), the amine is represented by the formula

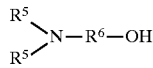

wherein each $R^5$ is independently a hydrocarbyl group of from 1 to about 20 carbon atoms and $R^6$ is an alkylene group of from 2 to about 18 carbon atoms.

29. The composition of claim 28 wherein said monoamine is diethyl ethanol 2 amine.

30. The composition of claim 22 wherein within (C2), the equivalent ratio of acylating agent to monoamine is in the range of about 1:0.5 to about 1:30.

31. The composition of claim 22 wherein within (C2), the equivalent ratio of acylating agent to monoamine is in the range of about 1:1 to about 1:2.5.

32. The composition of claim 1, further comprising (D) at least one weighting agent, (E) at least one clay or mixtures of (D) and (E).

33. The composition of claim 32 wherein the weighting agent (D) comprises barium sulfate, iron oxide, calcium chloride, calcium bromide, zinc chloride or zinc bromide.

34. The composition of claim 32 wherein the clay (E) comprises bentonite, attapulgite, sepiolite, montmorillonite, hectorite, saponite, and illite.

35. The composition of claim 1 wherein the water is present in the composition in an amount of about 10 to 95 parts by weight and the (A), (B) and (C) are present in the composition in an amount from about 5 to about 90 parts by weight, wherein the total parts by weight of water, (A), (B) and (C) is 100 parts.

36. A method to prevent settling and improve lubricity in water-based drilling fluids comprising the steps of: introducing into a well borehole an oil in water dispersion composition comprising a mixture of water, and (A) an overbased non-Newtonian colloidal disperse system comprising
  (1) solid metal-containing colloidal particles predispersed in
  (2) a disperse medium of at least one inert organic liquid and
  (3) at least one member selected from the class consisting of organic compounds which are substantially soluble in the disperse medium, where the molecules of said organic compound have polar substituents and hydrophobic portions;

(B) a water soluble associative thickener comprising a base-neutralized copolymer having copolymerized therein about 90 to about 99 mole percent of a carboxyl-containing, ethylenically unsaturated hydrocarbon and about 1 to about 10 mole percent of a nonionic surfactant acrylate having the formula:

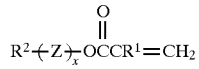

wherein $R^1$ is hydrogen or methyl, $R^2$ is a hydrophobe selected from the group consisting of alkyl and alkyl

wherein the alkyl contains 4 to 30 carbon atoms, Z is a divalent radical selected from the group consisting of oxyethylene units or mixed oxyalkylene units having the general formula:

where n is an integer having values from 2 to 4 and x is an integer having values of about 5 to 40;

(C) at least one dispersant; and drilling the well borehole.

* * * * *

UNITED STATES PATENT AND TRADEMARK OFFICE
CERTIFICATE OF CORRECTION

PATENT NO. : 5,851,961
DATED : December 22, 1998
INVENTOR(S) : James S. Magyar

It is certified that error appears in the above-identified patent and that said Letters Patent is hereby corrected as shown below:

In claim 1, column 33, at line 6, correct "R" to read --$R^1$--.

In claim 26, column 34, at line 62, delete "2".

In claim 27, column 34, at line 64, delete "2".

In claim 29, column 35, at line 10, delete "2".

Signed and Sealed this

Twenty-fifth Day of May, 1999

Q. TODD DICKINSON

*Attest:*

*Attesting Officer*   Acting Commissioner of Patents and Trademarks